(12) United States Patent
Kim

(10) Patent No.: US 7,218,727 B1
(45) Date of Patent: May 15, 2007

(54) APPARATUS AND METHOD FOR INPUTTING ALPHABET CHARACTERS ON SMALL KEYPAD

(76) Inventor: Min-Kyum Kim, 1191-2, Shinjung 3-dong, Yangchun-gu, Seoul, 158-073 (KR)

( * ) Notice: Subject to any disclaimer, the term of this patent is extended or adjusted under 35 U.S.C. 154(b) by 632 days.

(21) Appl. No.: 10/018,333

(22) PCT Filed: Jun. 9, 2000

(86) PCT No.: PCT/KR00/00601

§ 371 (c)(1),
(2), (4) Date: Feb. 15, 2002

(87) PCT Pub. No.: WO00/76186

PCT Pub. Date: Dec. 14, 2000

(30) Foreign Application Priority Data

| Jun. 9, 1999 | (KR) | 1999/21476 |
| Apr. 11, 2000 | (KR) | 2000-19079 |
| Apr. 14, 2000 | (KR) | 2000-19733 |
| Apr. 14, 2000 | (KR) | 2000-19734 |
| Apr. 24, 2000 | (KR) | 2000-21768 |
| May 3, 2000 | (KR) | 2000-23824 |
| May 10, 2000 | (KR) | 2000-25183 |
| May 15, 2000 | (KR) | 2000-25937 |
| May 25, 2000 | (KR) | 2000-28509 |

(51) Int. Cl.
*H04M 3/00* (2006.01)
(52) U.S. Cl. ............ 379/355.05; 379/356.01; 379/368
(58) Field of Classification Search ........... 379/355.05, 379/356.01, 368
See application file for complete search history.

(56) References Cited

U.S. PATENT DOCUMENTS

| 4,918,721 A | 4/1990 | Hashimoto |
| 5,392,338 A | 2/1995 | Danish et al. |
| 5,797,098 A * | 8/1998 | Schroeder et al. ..... 379/355.05 |
| 6,043,761 A * | 3/2000 | Burrell, IV ................ 379/368 |

FOREIGN PATENT DOCUMENTS

| EP | 0457077 | 11/1991 |
| KR | 2000-42791 | 7/2000 |

OTHER PUBLICATIONS

US 5,434,915, 07/1995, AT&T Corp. (Assignee) (withdrawn).

* cited by examiner

*Primary Examiner*—Jefferey F. Harold
(74) *Attorney, Agent, or Firm*—Harness, Dickey & Pierce, P.L.C.

(57) ABSTRACT

User can input characters and numerals without mode transition on a keypad using Part-Whole Selection (PWSM). Moreover, by allocating characters having higher use frequency to lattice elements on each button in the Order of Proximity to Base Lattice Element (OPBLE), input efficiency of the PWSM is maximized, and the number of times a button is pressed in the Base Repeat Selection Method (BRSM) is minimized. Applying Control Processing Method can simplify character arrangement on a keypad. For languages such as Korean, Hindi, Myanmar and the other languages in which consonants and vowels alternately come after each other, representative consonants and vowels are uniformly assigned to buttons on a keypad, thereby minimizing ambiguity when the RSM is used in input operation. Finally, representative consonants having phonetic values are allocated to Base Lattice Elements (BLEs) on each button, so that they can be used for memorizing or naming telephone numbers and a variety of codes.

2 Claims, 32 Drawing Sheets

FIG. 1-2
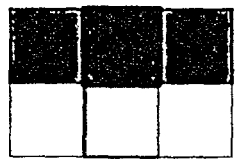
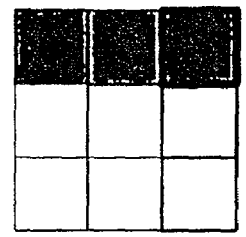
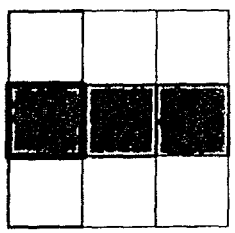
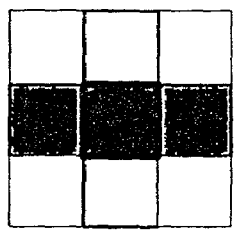
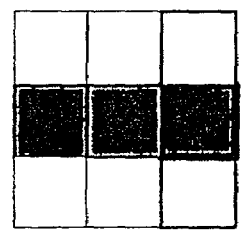
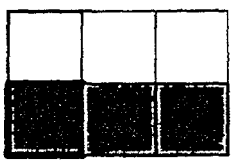
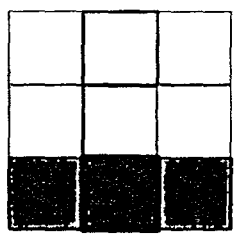
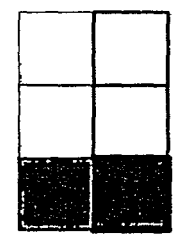
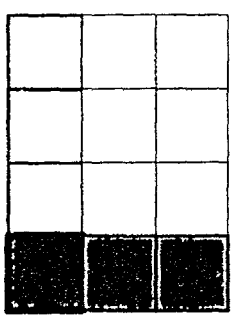
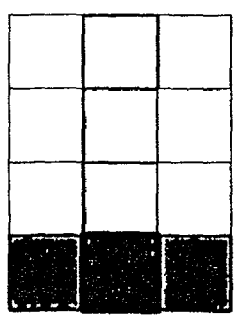
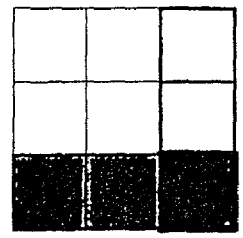

FIG. 1-3
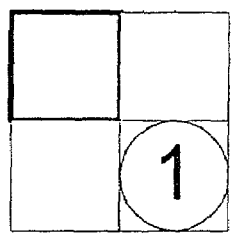
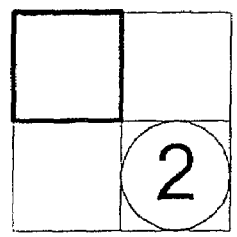
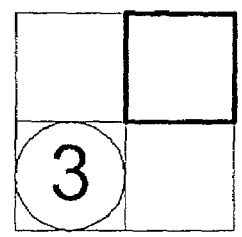
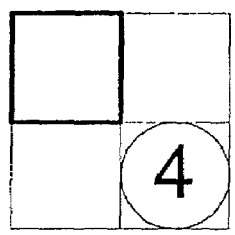
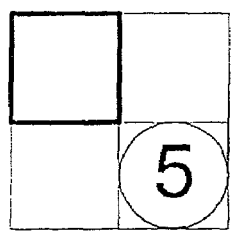
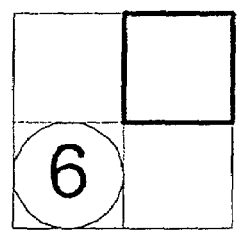
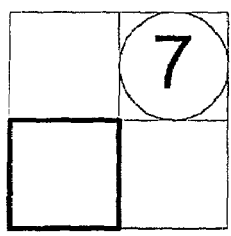
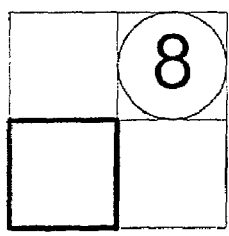
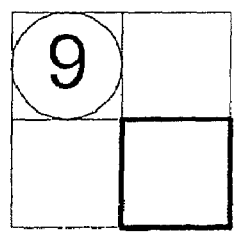
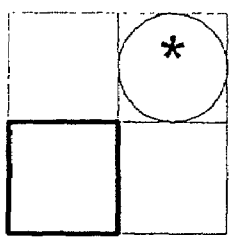
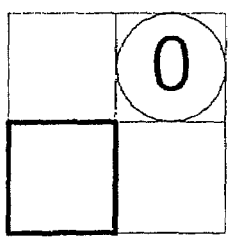
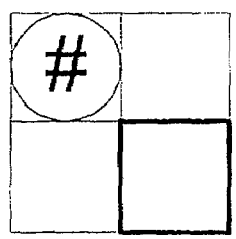

FIG. 1-11
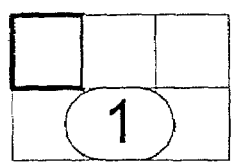
. Q Z
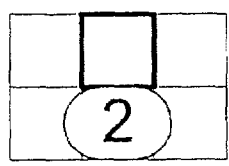
A B C
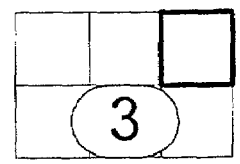
D E F
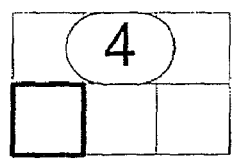
G H I
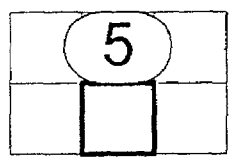
J K L
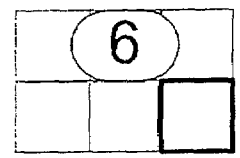
M N O
P R S
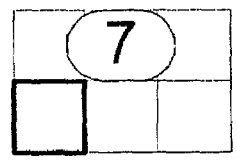
T U V
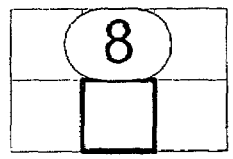
W X Y
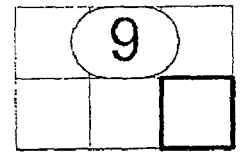
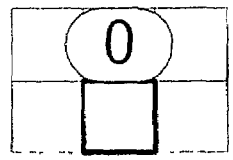
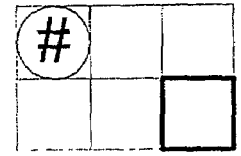

. Q Z

A B C

D E F

G H I

J K L

M N O

P R S

T U V

W X Y

FIG. 2-1
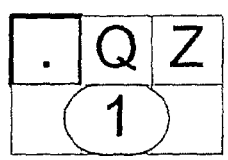 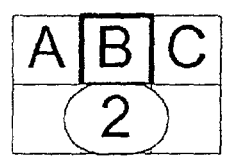 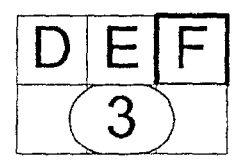
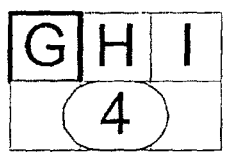 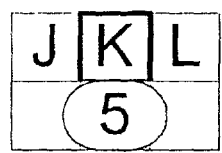 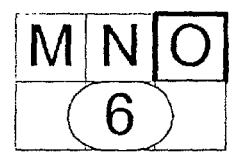
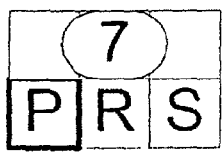 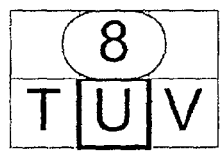 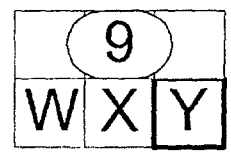
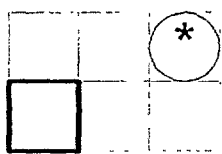 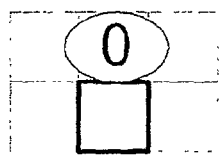 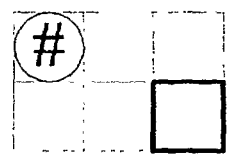

FIG. 3-1

FIG. 4-1
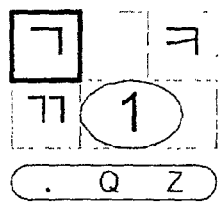
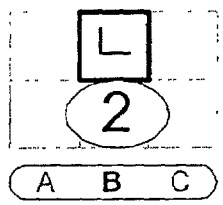
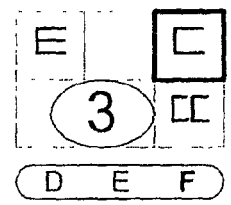
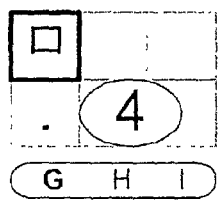
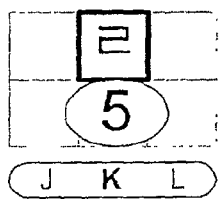
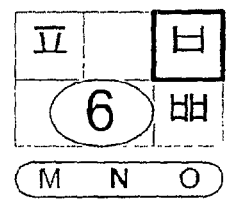
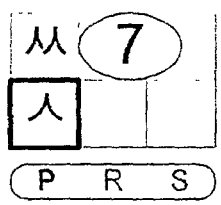
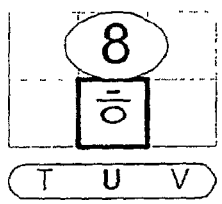
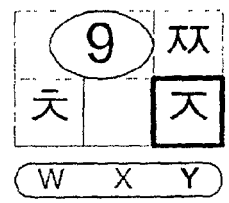
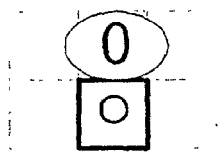
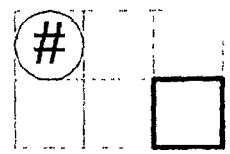

FIG. 4-2
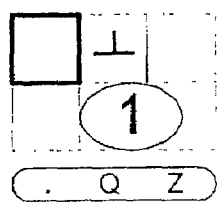
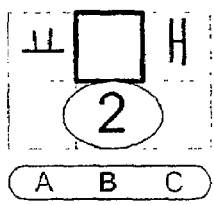
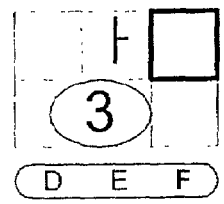
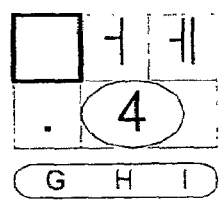
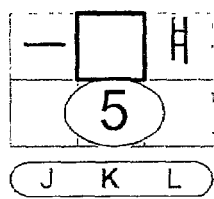
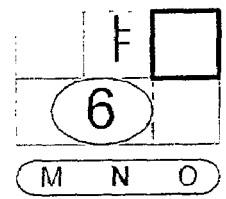
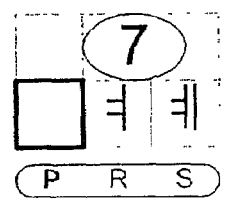
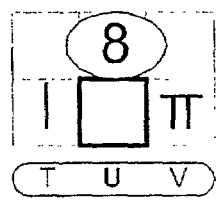
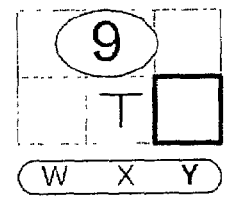
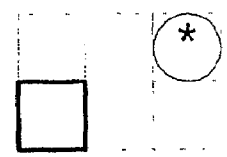
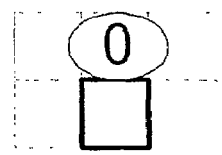
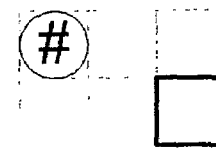

FIG. 4-3
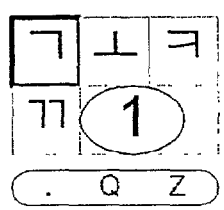
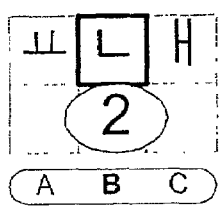
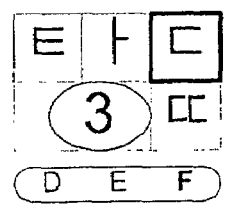
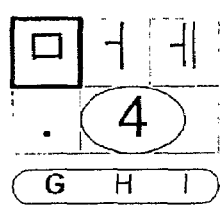
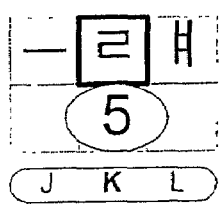
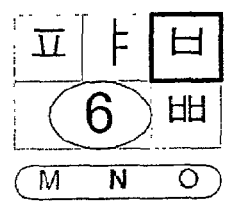
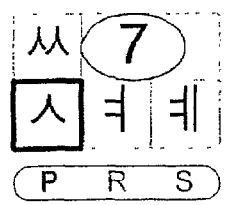
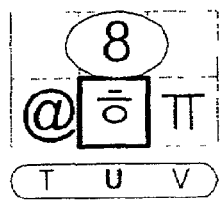
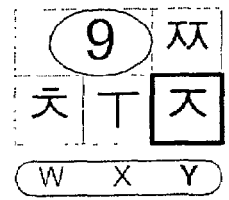
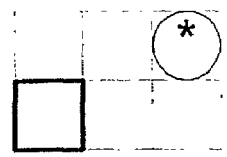
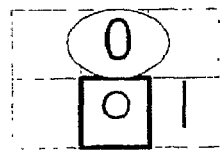
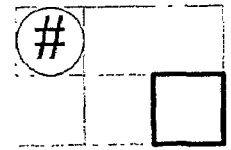

Tense Consonant

FIG. 4-5
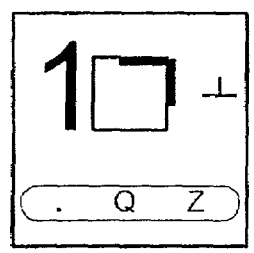 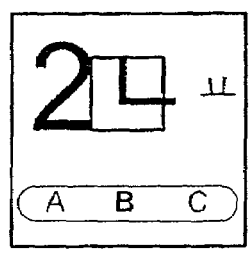 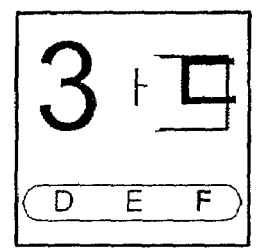
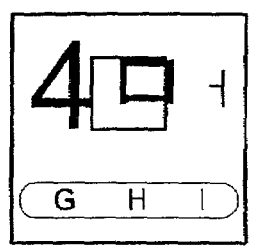 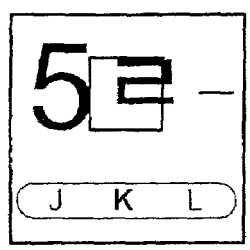 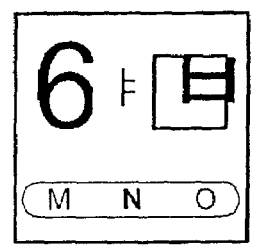
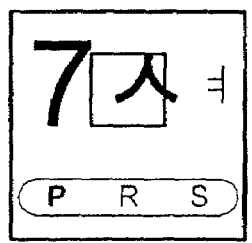 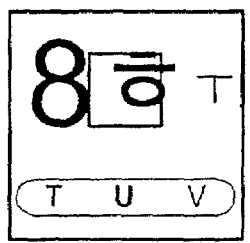 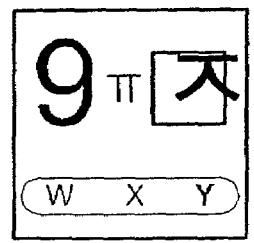
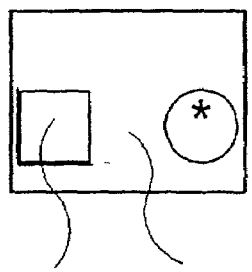 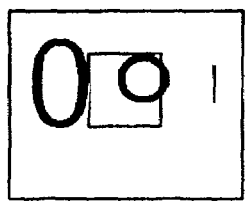 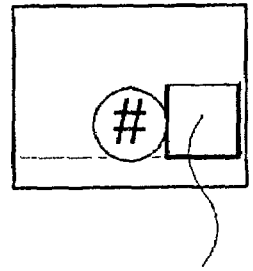
Aspirated Consonant  Tense Consonant          Extended Vowel FIG. 5-1
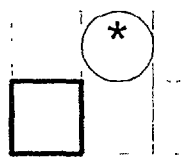
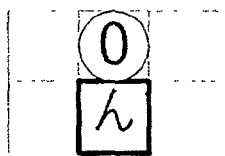
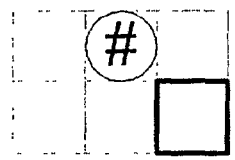

FIG. 5-2

FIG. 5-3
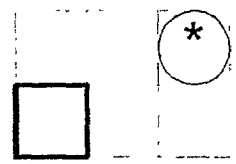
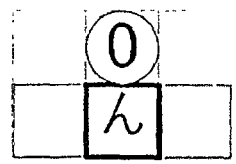
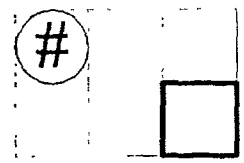

FIG. 5-4

FIG. 5-6
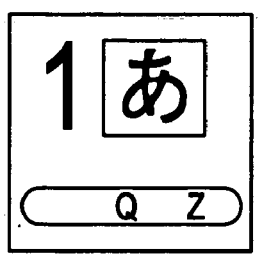 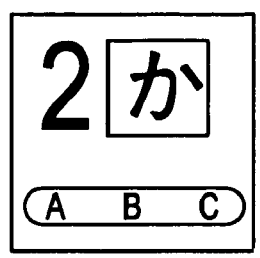 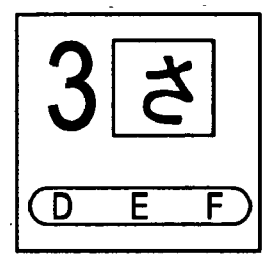
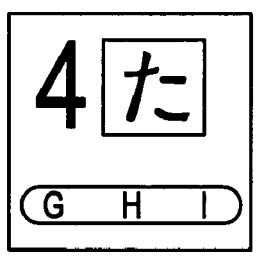 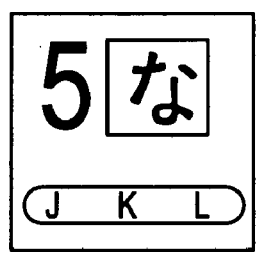 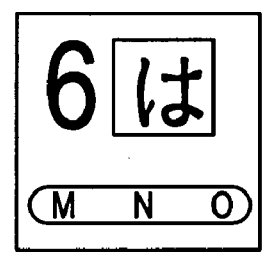
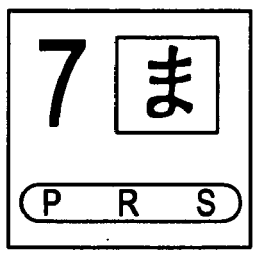 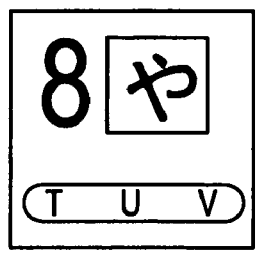 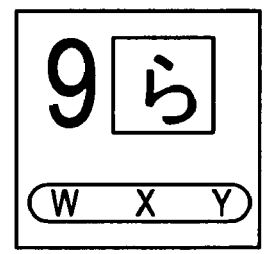
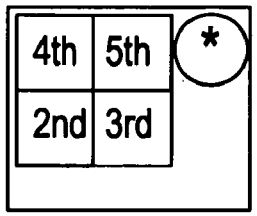 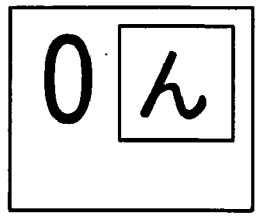 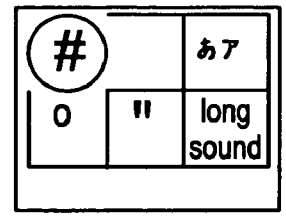

FIG. 5-7
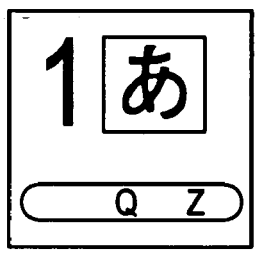 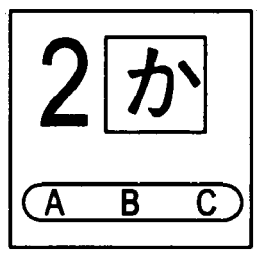 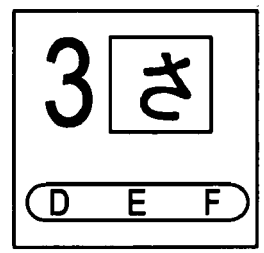
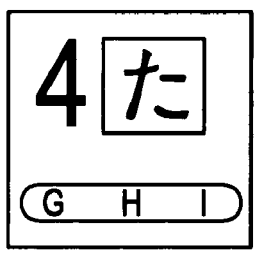 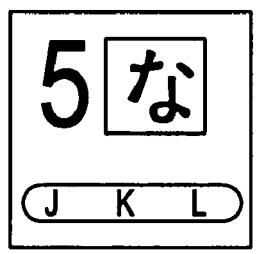 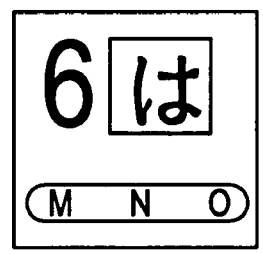
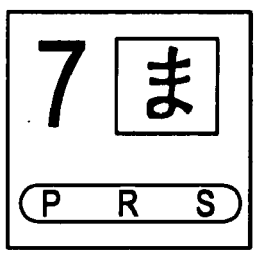 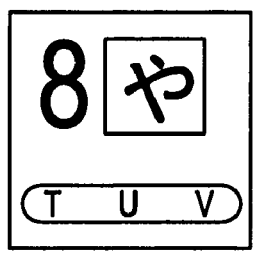 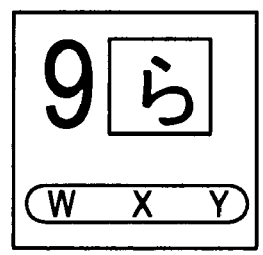
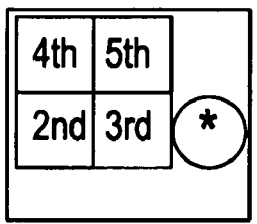 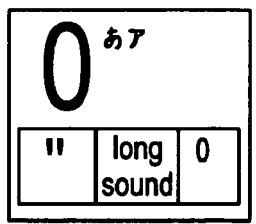 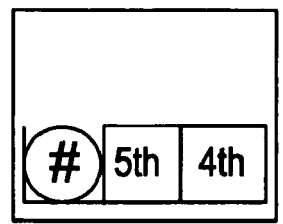

FIG. 6-1
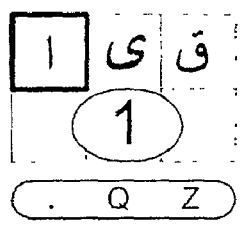
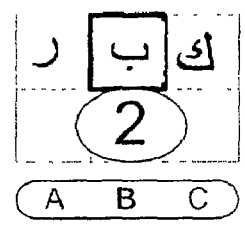
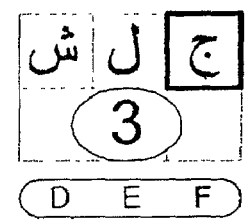
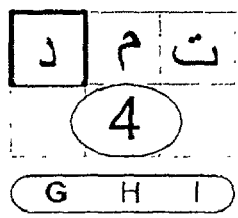
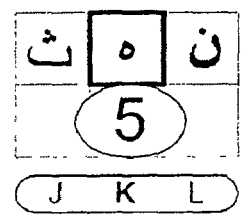
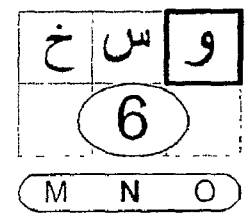
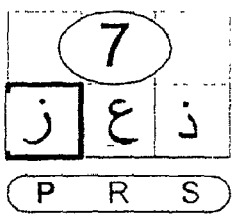
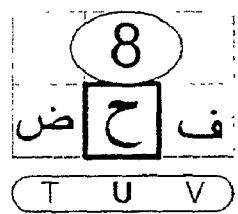
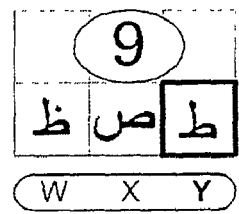
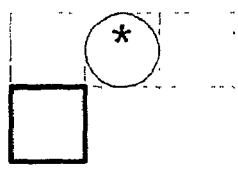
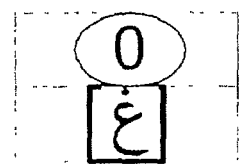
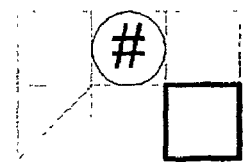

FIG. 6-2
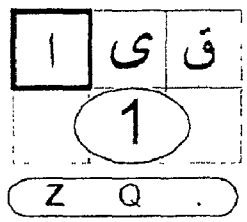
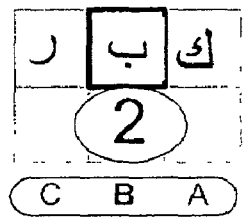
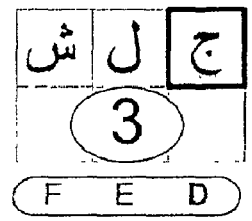
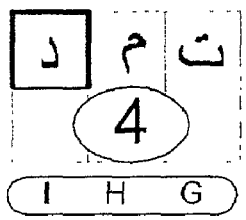
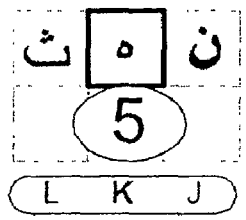
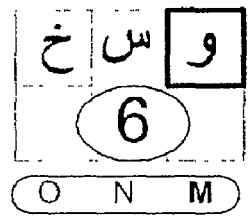
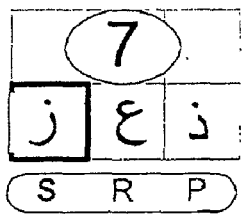
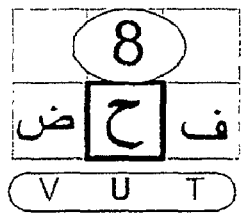
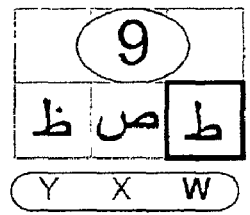
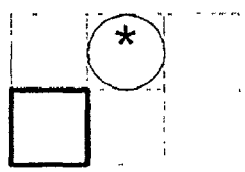
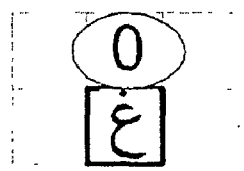
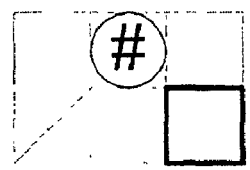

FIG. 6-3
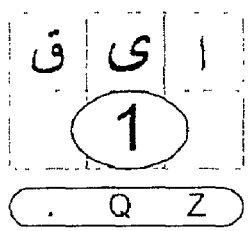
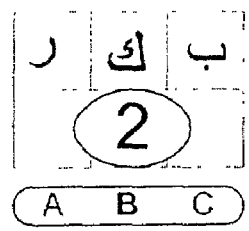
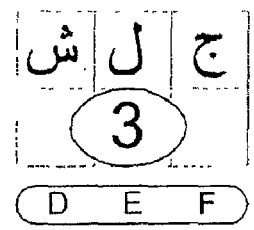
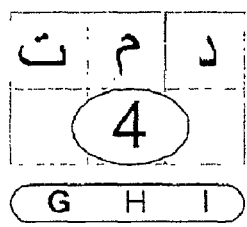
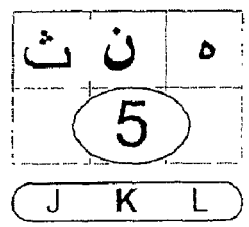
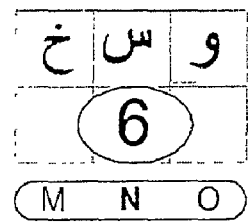
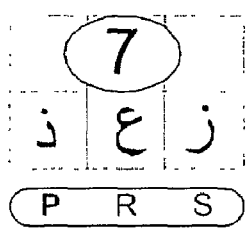
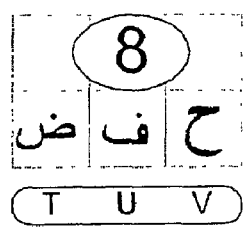
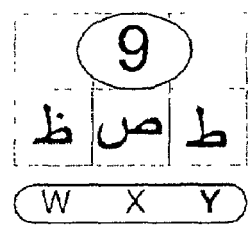
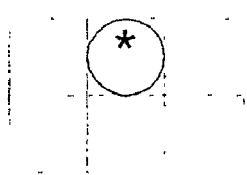
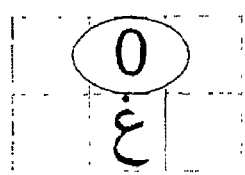
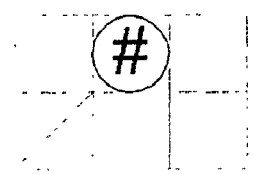

FIG. 7-1
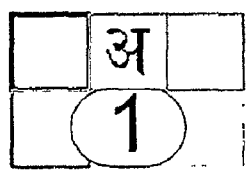
. Q Z
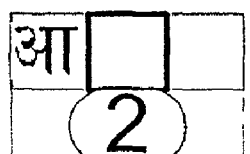
A B C
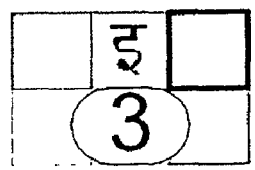
D E F
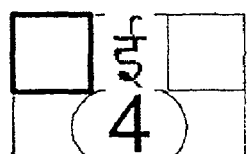
G H I
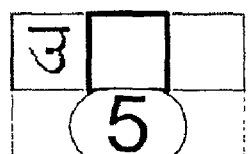
J K L
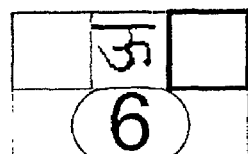
M N O
P R S
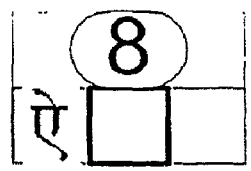
T U V
W X Y
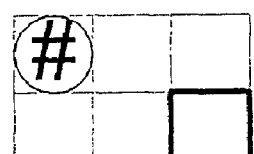

FIG. 7-2
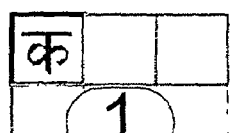 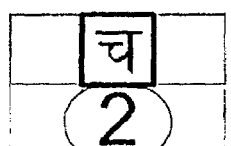 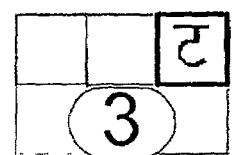
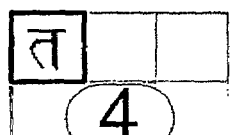 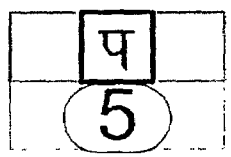 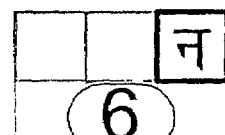
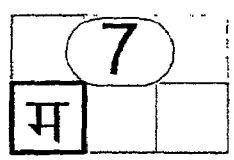  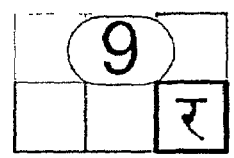
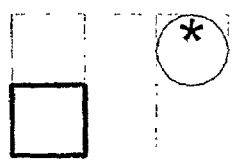 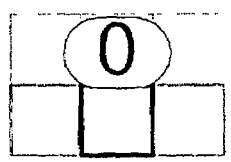 

FIG. 7-3

FIG. 7-4
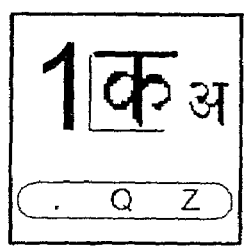 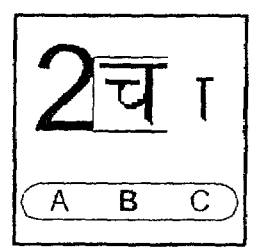 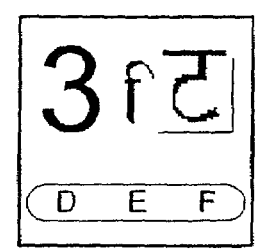
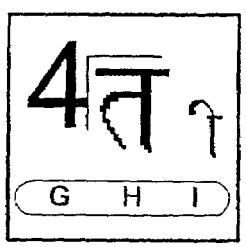 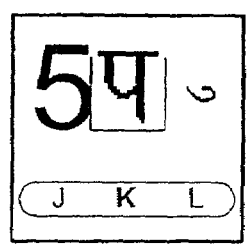 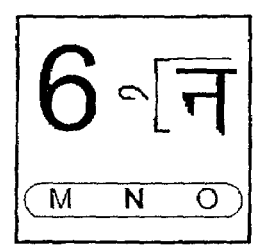
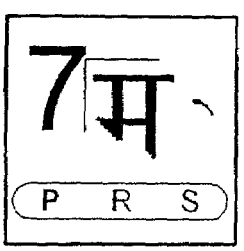  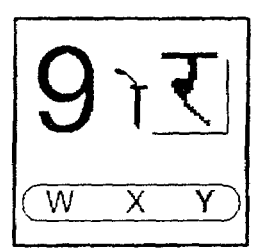
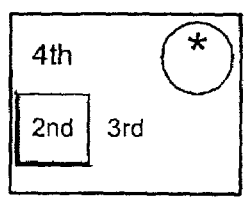 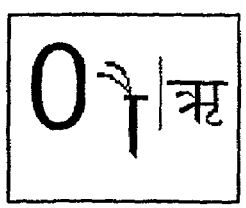 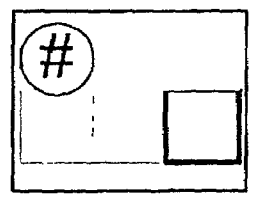

FIG. 8-1
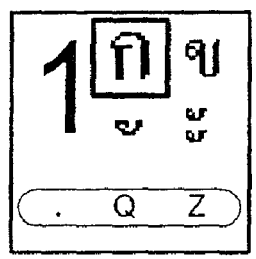
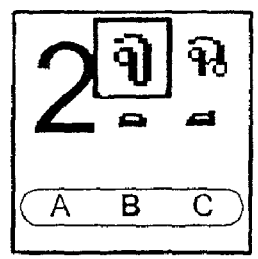
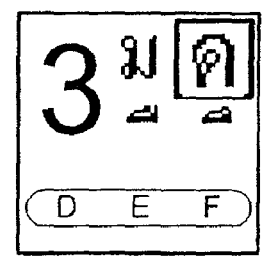
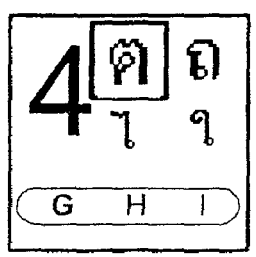
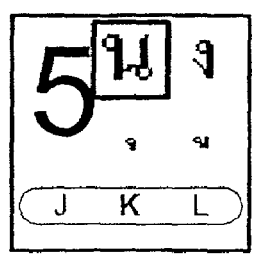
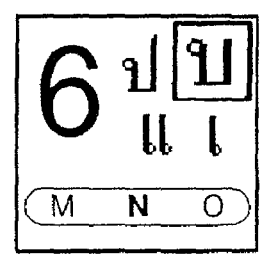
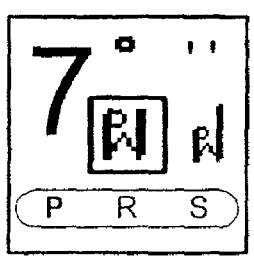
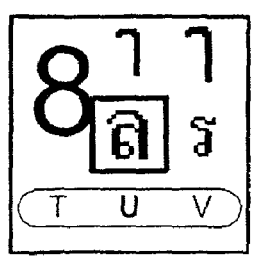
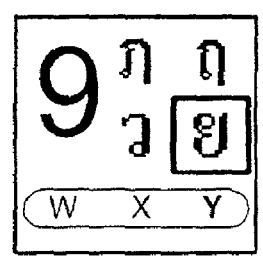
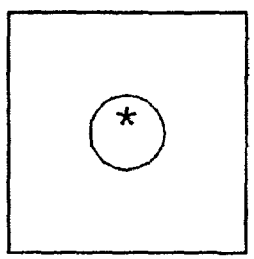
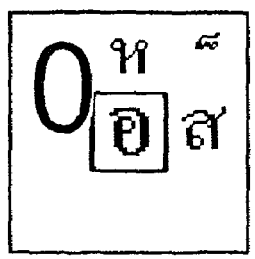
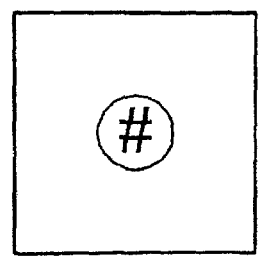

FIG. 8-2
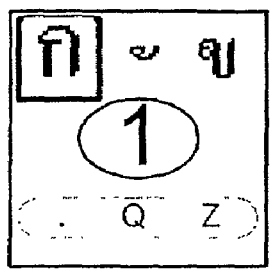
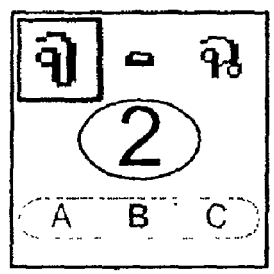
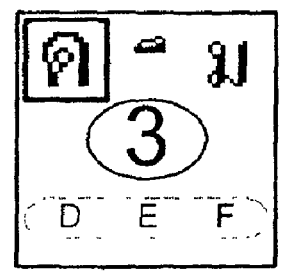
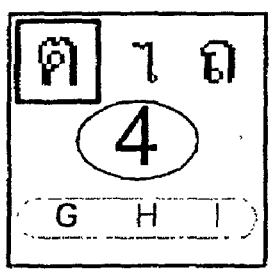
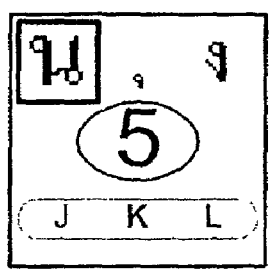
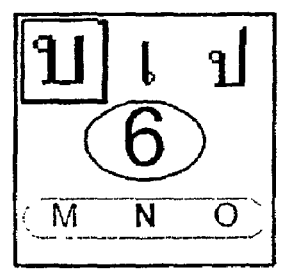
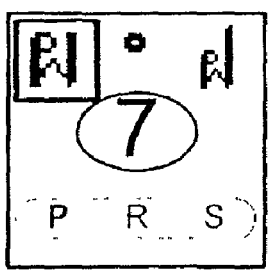
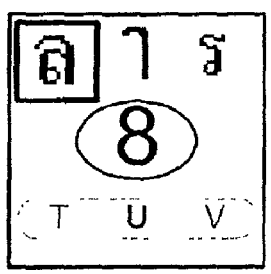
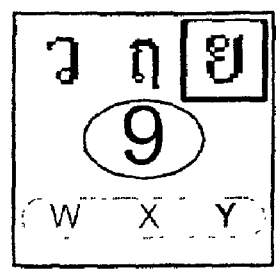
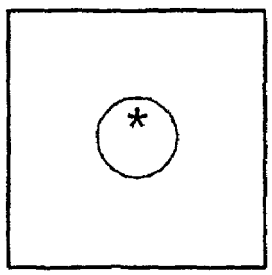
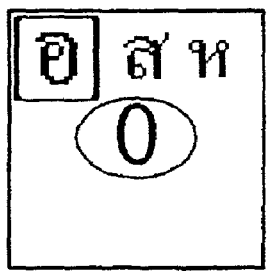
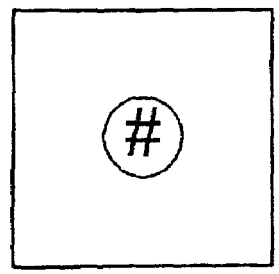

FIG. 8-3

APPARATUS AND METHOD FOR INPUTTING ALPHABET CHARACTERS ON SMALL KEYPAD

This application is the national phase under 35 U.S.C. § 371 of PCT International Application No. PCT/KR00/00601 which has an International filing date of Jun. 9, 2000, which designated the United States of America.

TECHNICAL FIELD

The present invention relates to an apparatus and method for inputting alphabet characters on a keypad, and more particularly, to an apparatus and method for inputting alphabet characters on a keypad like a telephone keyboard which does not have enough buttons for the alphabet characters.

BACKGROUND ART

As wireless communication has developed, voice communication centered mobile terminals have provided more functions for communicating digital character information. Therefore, a keypad originally designed for telephone number input becomes to include means for inputting characters. The size of a keypad used for a mobile terminal tends to be smaller, thereby limiting the number of buttons on the keypad. Meanwhile, there are 27 alphabet characters in Korean, 24 in English, 46 in Japanese, 24 and more in alphabets derived from the Roman alphabet. Like this, the alphabets of almost every language include over 12 characters that is the number of buttons used on a usual telephone keypad. Therefore, one button or the combination of two or more buttons is used to input one character through the telephone keypad.

Conventional methods of inputting alphabet characters using a small keypad can be classified into a character selection type, a character creation type, and a mixed type. In the character selection type, a plurality of characters are assigned to a single keypad button, so a character (hereinafter, referred to as a "target character") which a user intends to select on a keypad can be selected by pressing a corresponding button a predetermined number of times. This type of input method is used for English as proposed by the E.161 recommendations of the International Telecommunications Union—Telecommunication Standardization Sector (ITU). In the character creation type, primary or atomic character elements (stokes such as →, ↓, ✓, ↘, ⊃, ○, etc) are individually assigned to keypad buttons, so a target character is created by operating the buttons so that the shape of the target character can be formed. In the mixed type, some of the alphabet characters are processed according to the character selection type, and the remaining characters are processed according to the character creation type. In the example of the mixed type for the Korean alphabet, consonants are processed according to the selection type and vowels are processed according to the character creation type.

As described above, in the conventional three types, a target character is input by operating one or more buttons on a keypad.

The character selection type can be divided into several methods as follows. In a first method, a plurality of characters (generally, 3~4 characters) are assigned to each button, so a character assigned first to the button is selected when the button is pressed once, a character assigned secondly to the button is selected when the button is pressed two times and so on. In a second method, characters (generally, 3~4 characters) are assigned to each button, so a character assigned first to the button is selected when the button is pressed once, and a character assigned secondly to the button is selected by the combination of the button and a particular button (such as [#] or [*] button). In a third method, characters are assigned between two buttons, and a target character is selected by the combination of the two buttons.

There are some innate faults in the first method. If it is assumed that three characters 'A', 'B' and 'C' are assigned to a [2] button, when a user wants to sequentially input the characters 'A', 'B' and 'C', the user is supposed to consecutively press the [2] button six times. In this case, there is ambiguity among the input of 'A', 'B' and 'C', the input of 'B', 'B' and 'B' and the input of 'C', 'B' and 'A'. To overcome this problem, the user is supposed to press the button six times with time delay between the characters like [2]-[2][2]-[2][2][2]. However, it is not easy to verify that a target character is input correctly in a terminal such as a normal telephone unprovided with a display window. Moreover, according to the first method, the more characters that are assigned to each button, the greater the number of times a button needs to be pressed for one character. For example, when three alphabet characters are assigned to each button for English, it is necessary to press buttons an average of two times for each character. When five alphabet characters are assigned to each button for Japanese, it is necessary to press buttons an average of three times for each character. Accordingly, when 5 or more characters are assigned to each button for an alphabet, it may be necessary to press buttons 5 or more times for one character, so it is very inconvenient, and accuracy is low.

In the second method, when a user wants to input a character not assigned first to a button, the user should press a particular button such as a [#] or [*] button in addition to the button to which the character is assigned. Accordingly, it is not easy for the user to be familiar with a character input method.

The third method has the advantages of simplicity and consistency in inputting characters. However, this method is not fit for a mnemonic number dialing plan, and it is not easy to print characters in the small space between buttons on a miniaturized mobile terminal such as a cellular phone, a PCS phone, and an IMT-2000 phone.

SUMMARY OF THE INVENTION

The present invention will be fully described with reference to the attached drawings.

In this invention, a keypad is a standard normal telephone keypad. It is assumed that a keypad employed in the present invention includes 12 buttons, [1], [2], [3], [4], [5], [6], [7], [8], [9], [0], [#] and [*]. A 9-button keypad with [1] to [9] is referred to as a "3*3 keypad", and a 12-button keypad with 10 [1] to [0] numeral buttons and [*] and [#] buttons is referred to as a "3*4 keypad".

First, a "Part-Whole Selection Method (PWSM)" according to the present invention will be described. Each button on a keypad is provided with a lattice containing a predetermined number of lattice elements forming a plot resembling that of a whole keypad. Alphabet characters are arranged in the lattice of each button. A target character can be selected by the combination of a first button to which the target character is actually arranged on the keypad and a second button located at a position on the keypad, which corresponds to a lattice element having the target character on the first button.

This PWSM is based on the principle that a microcosm (the location of a character on each button) reflects a macrocosm (the location of a button on a whole keypad). In other words, I (a macrocosm or a button) am created from the world (a macrocosm or a keypad), and I (the macrocosm or the button) reflect the world (the macrocosm or the keypad). Thus, the combination of buttons for a target character is created based on the principle that "I exist and then this world exists". Therefore, this method is referred to as a PWSM or a Microcosm Selection Method (MSM).

The PWSM has an advantage of simplicity without any ambiguity. However, since it is necessary to press buttons two times for inputting each character, for some languages, it may be necessary to press buttons more times as compared to a conventional repeated selection method.

When a user presses the first and second buttons according to a PWSM of the present invention, the "Convenient Order of Button Combination (COBC)" is as follows. The COBC may be a little different depending on a manuscript style (e.g., horizontal writing or vertical writing) and personal liking, but the following is determined taking into account normal persons acquainted with horizontal writing.

Table 1.1 shows an example in which factors to be considered in determining the COBC are applied according to the order of priority of identical combination, horizontal combination, straight combination and adjacent combination.

Table 1.2 shows an example in which factors to be considered in determining the COBC are applied according to the order of priority of identical combination, horizontal combination, adjacent combination and straight combination.

TABLE 1.2

| Order | Names | Examples | | |
|---|---|---|---|---|
| 1 | IC | [1] + [1] | Using | Using |
| 2 | HAC | [1] + [2] or [2] + [1] | 3 × 3 | 3 × 4 |
| 3 | H1C | [1] + [3] or [3] + [1] | lattice | lattice |
| 4 | VAC | [1] + [4] or [4] + [1] | | |
| 5 | ADC | [1] + [5] or [5] + [1] | | |
| 6 | V1C | [1] + [7] or [7] + [1] | | |
| 7 | H1DC | [1] + [6] or [6] + [1] | | |
| 8 | V1DC | [1] + [8] or [8] + [1] | | |
| 9 | HV1DC | [1] + [9] or [9] + [1] | | |
| 10 | V2C | [1] + [*] or [*] + [1] | | |
| 11 | HAV2DC | [1] + [0] or [0] + [1] | | |
| 12 | H1V2DC | [1] + [#] or [#] + [1] | | |

Table 1.3 shows an example in which factors to be considered in determining the COBC are applied according to the order of priority of identical combination, adjacent combination, horizontal combination and straight combination. This is effective in using the space on the button.

TABLE 1.3

| Order | Names | Examples/Classification | | | | |
|---|---|---|---|---|---|---|
| 1 | IC | [1] + [1] | Using 2 × 2 lattice | Using 3 × 2 lattice | Using 3 × 3 lattice | Using 3 × 4 lattice |
| 2 | HAC | [1] + [2] or [2] + [1] | | | | |
| 3 | VAC | [1] + [4] or [4] + [1] | | | | |

TABLE 1.1

| Order | Names | Examples/classification | | | | | |
|---|---|---|---|---|---|---|---|
| 1 | Identical Combination (IC) | [1] + [1] | IC | Horizontal Straight Combination (HDC) (using 3 × 1 lattice) | Horizontal Vertical Straight Combination (HVSC) | 3*3 Button Combination (using 3 × 3 lattice) | 3*4 Button Combination (using 3 × 4 lattice) |
| 2 | Horizontal Adjacent Combination (HAC) | [1] + [2] or [2] + [1] | | | | | |
| 3 | Horizontal 1 button gap Combination (H1C) | [1] + [3] or [3] + [1] | | | | | |
| 4 | Vertical Adjacent Combination (VAC) | [1] + [4] or [4] + [1] | | | | | |
| 5 | Vertical 1 button gap Combination (V1C) | [1] + [7] or [7] + [1] | | | | | |
| 6 | Vertical 2 button gap Combination (V2C) | [1] + [*] or [*] + [1] | | | | | |
| 7 | Adjacent Diagonal Combination (ADC) | [1] + [5] or [5] + [1] | ADC | Diagonal Combination (DC) | | | |
| 8 | Horizontal 1 button gap & Diagonal Combination (H1DC) | [1] + [6] or [6] + [1] | Non-Adjacent Diagonal Combination (NADC) | | | | |
| 9 | Vertical 1 button gap & Diagonal Combination (V1DC) | [1] + [8] or [8] + [1] | | | | | |
| 10 | Horizontal & Vertical 1 button gap Diagonal Combination (HV1DC) | [1] + [9] or [9] + [1] | | | | | |
| 11 | Horizontal Adjacent & Vertical 2 button gap Diagonal Combination (HAV2DC) | [1] + [0] or [0] + [1] | | | | | |
| 12 | Horizontal 1 button gap & Vertical 2 button gap Diagonal Combination (H1V2DC) | [1] + [#] or [#] + [1] | | | | | |

TABLE 1.3-continued

| Order | Names | Examples/Classification | |
|---|---|---|---|
| 4 | ADC | [1] + [5] or | |
| | | [5] + [1] | |
| 5 | H1C | [1] + [3] or | |
| | | [3] + [1] | |
| 6 | H1DC | [1] + [6] or | |
| | | [6] + [1] | |
| 7 | V1C | [1] + [7] or | |
| | | [7] + [1] | |
| 8 | V1DC | [1] + [8] or | |
| | | [8] + [1] | |
| 9 | HV1DC | [1] + [9] or | |
| | | [9] + [1] | |
| 10 | V2C | [1] + [*] or | |
| | | [*] + [1] | |
| 11 | HAV2DC | [1] + [0] or | |
| | | [0] + [1] | |
| 12 | H1V2DC | [1] + [#] or | |
| | | [#] + [1] | |

Table 1.4 shows an example in which factors to be considered in determining the COBC are applied according to the order of priority of identical combination, adjacent combination, vertical combination and straight combination. This is for the person who is acquainted with vertical writing.

TABLE 1.4

| Order | Names | Examples/Classification | | | | |
|---|---|---|---|---|---|---|
| 1 | IC | [1] + [1] | Using 2 × 2 lattice | Using 2 × 3 lattice | Using 3 × 3 lattice | Using 3 × 4 lattice |
| 2 | VAC | [1] + [4] or [4] + [1] | | | | |
| 3 | HAC | [1] + [2] or [2] + [1] | | | | |
| 4 | ADC | [1] + [5] or [5] + [1] | | | | |
| 5 | V1C | [1] + [7] or [7] + [1] | | | | |
| 6 | V1DC | [1] + [8] or [8] + [1] | | | | |
| 7 | H1C | [1] + [3] or [3] + [1] | | | | |
| 8 | H1DC | [1] + [6] or [6] + [1] | | | | |
| 9 | HV1DC | [1] + [9] or [9] + [1] | | | | |
| 10 | V2C | [1] + [*] or [*] + [1] | | | | |
| 11 | HAV2DC | [1] + [0] or [0] + [1] | | | | |
| 12 | H1V2DC | [1] + [#] or [#] + [1] | | | | |

Based on Table 1.1, Table 1.2, Table 1.3 and Table 1.4, the more frequently used character is located at a lattice element having more combination convenience when characters are assigned to buttons on a keypad.

Since the combinations 1 to 10 in Table 1.1 uses 9 buttons [1] to [9], they can be referred to as "3*3 button combinations". All the combinations 1 to 12 can be referred to as "3*4 button combinations". The combinations are defined based on the number of buttons because numeral buttons [1] to [9] or [1] to [0] are usually used in inputting alphabet characters, and [#] and [*] buttons are used for other functions.

For example, the number of horizontal straight combinations (HSCs) (i.e., 3*3 HSCs) obtained from the 3*3 button combination is 27(=3*9), which is good enough to accommodate the English alphabet. The number of straight combinations (i.e., 3*3 straight combinations) obtained from the 3*3 button combination is 45(=5*9), which can accommodate the alphabets of almost every language in the world. Therefore, the present invention can be effectively applied to languages such as Japanese, Thai, Myanmar, Indian and Cambodian having a lot of alphabet characters. Table 2 shows the number of occasions in each combination.

TABLE 2

| Main classification | Sub-classification | The number of combinations when using a 3*3 keypad | The number of combinations when using a 3*4 keypad |
|---|---|---|---|
| Straight combination (SC) | IC | 1 * 9 = 9 | 1 * 12 = 12 |
| | Horizontal SC (HSC) | 3 * 9 = 27 | 3 * 12 = 36 |
| | Horizontal & vertical SC (HVSC) | 5 * 9 = 45 | 6 * 12 = 72 |
| Diagonal combination (DC) | ADC | 16 | 24 |
| | Non-ADC | 20 | 60 |
| 3*3 combination | | 9 * 9 = 81 | |
| 3*4 combination | | | 12 * 12 = 144 |

FIG. 1 shows examples of the arrangement of a lattice, which corresponds to the arrangement of buttons on a keypad, formed on the buttons on the keypad.

In FIG. 1, black lattice elements are used for an identical combination. A black lattice element for the identical combination is referred to as a "base lattice element (BLE)". Dark gray lattice elements are used for a horizontal straight combination (HSC). The line of dark gray lattice elements is referred to as a "base row (BR)" because it contains a BLE. The line of light gray lattice elements is referred to as a "base column (BC)" because it contains a BLE. The arrangement of lattice elements of three columns and one row containing a BLE is referred to as a "3×1 lattice", which is the same as the horizontal straight combination. The arrangement of lattice elements of three columns and two rows containing a BLE is referred to as a "3×2 lattice". The arrangement of lattice elements of two columns and two rows containing a BLE is referred to as a "2×2 lattice". The arrangement of lattice elements of three columns and three rows is referred to as a "3×3 lattice".

When alphabet characters are not many, the characters may be allocated to only some of the lattice elements based on the COBC as shown in Tables 1.1 to 1.4. FIG. 2 shows examples of the arrangements of lattice elements formed on buttons on a keypad when alphabet characters are not many.

Instead of forming a lattice on each button, a character to be allocated to a BLE among the characters assigned to the button may be discriminated from the other characters by making it different in size, thickness or color or by making it embossed or framed. Such a distinctly formed character is referred to as a "base character" and is the same as a character allocated to a BLE. A keypad to which the concept of a BLE or a base character is applied is referred to as a "Base Keypad (BK)", and a keypad to which the concept of a BLE or a base character is not applied is referred to as a "Plain Keypad (PK)".

In the present invention, a character is represented by the combination of two buttons on a keypad. In a terminal with a display window, buttons available for a second button may be displayed after a user selects a first button corresponding to a certain character, thereby allowing the user to easily select a correct button. For the Korean alphabet, three vowel elements can be assigned to three buttons, respectively, and the consonants can be assigned to the remaining 7 buttons according to the principle of the present invention.

The PWSM can accommodate a plurality of alphabets and controls using a lattice. This can be realized by assigning a variety of functions (controls) such as mode transition, move, deleting and entering to [*], [0] and [#] buttons on a keypad.

The following description concerns a "Base Repeat Selection Method (BRSM)" according to the present invention. In the BRSM, a character among the characters allocated to the lattice elements on a button is selected depending on how many times the button is pressed according to the "Order of Proximity to a BLE (OPBLE)" in a BK. The OPBLE does not indicate the order in which a character is physically adjacent to a BLE, but indicates the order that is substantially similar to the COBC shown in Table 1.1, Table 1.2 and Table 1.3. The OPBLE may be a little different in detailed elements depending on the properties of each language, the tendency of each person, etc. The BRSM is advantageous in minimizing the number of times buttons are pressed by allocating frequently used characters according to the OPBLE, but has a problem of ambiguity in inputting characters.

Ambiguity occurring in the BRSM can be avoided by using time delay between input characters. In this case, proper time delay may be different for individuals due to their different proficiencies in operating buttons. Therefore, it is preferable to allow a user to set a delay time proper to his/her own use.

There can be relative time setting and absolute time setting in time delay setting. In the relative time setting, a delay time is based on a relative ratio (e.g., 120% or 80%) to a default value of delay time. In the absolute time setting, an absolute delay time (e.g., 0.5 second or 1 second) desired by a user is set as a delay time.

A most frequently used character is located at a BLE (the position of an identical combination in the PWSM) in a BK. Accordingly, characters will be identified by the number of times a button is pressed according to the OPBLE, that is, the COBC shown in Table 1.1, Table 1.2 and Table 1.3.

When there are many characters (or lattice elements) located in the left and right sides or the top and bottom sides, as shown on the basis of a [5] button, selection priority may be given to a character allocated to the left or right side over a character allocated to the top or bottom side, or vice versa. When there are characters in the left and right sides, as shown on the basis of a [2], [5], [8] or [0] button, selection priority may be given to a character allocated to the left side over a character allocated to the right side, or vice versa. The selection priority will be determined depending on culture and feeling of each country. Similarly, when there are characters in the top or bottom sides, as shown on the basis of a [4], [5] or [6] button, selection priority may be given to a character allocated to the top side over a character allocated to the bottom side, or vice versa.

In the following example, the OPBLE is determined such that lattice elements horizontally arranged on the basis of a BLE are more adjacent to the BLE than vertically arranged lattice elements, and the left lattice element is more adjacent than the right lattice element in the horizontal direction, and the top lattice element is more adjacent than the bottom lattice element in the vertical direction.

The following is an example of order in which characters allocated to lattice elements on [1], [3], [7] and [9] buttons are selected when the button is repeatedly pressed according to the BRSM. Modification can be made in each actual embodiment.

1st selection: A character at a BLE is selected
2nd selection: A character at a lattice element making the HAC with the BLE is selected
3rd selection: A character at a lattice element making the H1C with the BLE is selected
4th selection: A character at a lattice element making the VAC with the BLE is selected
5th selection: A character at a lattice element making the V1C with the BLE is selected
6th selection: A character at a lattice element making the ADC with the BLE is selected
7th selection: A character at a lattice element making the V2C with the BLE is selected (in the cases of [1] and [3] buttons)
8th selection: A character at a lattice element making the NADC with the BLE is selected The following is an example of the selection order of characters allocated to lattice elements on [4] or [6] buttons according to a repeated selection method (RSM).

1st selection: A character at a BLE is selected
2nd selection: A character at a lattice element making the HAC with the BLE is selected
3rd selection: A character at a lattice element making the H1C with the BLE is selected
4th selection: A character at a top lattice element making the HSC with the BLE is selected
5th selection: A character at a bottom lattice element making the HSC with the BLE is selected
6th selection: A character at a lattice element making the ADC with the BLE is selected The following is an example of the selection order of characters allocated to lattice elements on [2] and [8] buttons according to the BRSM.

1st selection: A character at a BLE is selected
2nd selection: A character at a left lattice element making the HSC with the BLE is selected
3rd selection: A character at a right lattice element making the HSC with the BLE is selected
4th selection: A character at a lattice element making the VAC with the BLE is selected
5th selection: A character at a lattice element making the V1C with the BLE is selected
6th selection: A character at a lattice element making the ADC with the BLE is selected The following is example of the selection order of characters allocated to lattice elements on a [5] button according to the BRSM.

1 st selection: A character at a BLE is selected
2nd selection: A character at a left lattice element making the HSC with the BLE is selected
3rd selection: A character at a right lattice element making the HSC with the BLE is selected
4th selection: A character at a top lattice element making the HSC with the BLE is selected
5th selection: A character at a bottom lattice element making the HSC with the BLE is selected
6th selection: A character at a lattice element making the ADC with the BLE is selected
7th selection: A character at a lattice element making the NADC with the BLE is selected It is obvious that a character selected at the 6th selection is selected at the 5th selection when a character satisfying the condition of the 5th selection does not exist in the example for the [5] button.

The following description concerns examples of a BK including buttons for characters and buttons for controls of inputting the alphabet characters of a variety of languages to employ a PWSM and a BRSM according to the present invention.

When a BK for each language is prepared, it is advantageous in that a user can choose either the PWSM or the BRSM based on the user's preference. The BK is also advantageous in maximizing the convenience when inputting characters according to the PWSM because frequently used characters are allocated to lattice elements having higher priority according to the COBC and minimizing the number of times buttons are pressed when inputting characters according to the BRSM.

Various controls in a BK may be selected in the same manner as described above. The term "control" is equivalent to a function in a keyboard. The BK may be provided with keys for a variety of functions such as a mode transition function (capital/small, shift, character mode, number mode, etc), a move function and an entering function. All of these kinds of functions are referred to as "controls", and a button to which a control is assigned is referred to a "control button".

A control is usually selected first to achieve the effect of a corresponding function. However, a control button for the selection of an affix can be considered as a control button for inputting a character, and such a control can be selected before or after the input of a character combined with an affix.

These controls can be assigned to buttons on a keypad (a BK) and selected according to the PWSM or the BRSM. Special buttons may separately be provided for these controls. Alternatively, some buttons on a 3*4 keypad may be selectively used for these controls. As mentioned above, a BK can be designed such that characters can be input using [1] to [9] buttons (a 3*3 keypad) or [1] to [0] buttons, and controls can be input using the other buttons ([*], [0] and [#] or [*] and [#]).

Furthermore, one among the PWSM, the BRSM and the SRSM may be employed for inputting characters while either BRSM or SRSM may be employed for inputting controls. When a control button is designed to be repeatedly used (that is, when a control button is designed to be selected according to the RSM), a button (i.e., a control button) to which controls are assigned must not be used for any combination for characters or other controls in the PWSM. For example, when characters are assigned to [1] to [9] buttons and controls are assigned to a [*] button, the controls assigned to the [*] button can be selected in the RSM under the condition that the [*] button is not used for any combination for inputting characters in the PWSM.

It is convenient to repeatedly use a control button regardless of an alphabet character input method when a few controls are assigned to the control button. Using a control button for processing an affix (forming a character with an affix) can simplify a keypad because affixed characters are not necessary to be assigned to buttons on the keypad. This is similar to using a "shift" key such as pressing [shift] and [a] keys simultaneously in a keyboard when a user wants to enter a capital "A" in small character mode, without assigning capital letters to the keys of the keyboard. This is helpful for inputting affixed characters in alphabets derived from the Roman alphabet through a keypad.

Furthermore, for languages having many characters, only some characters (referred to as representative characters), which are frequently used and can represent groups of characters, are inscribed on the buttons of a keypad. A character (referred to as a succeeding character) belonging to a group represented by a representative character may be input by combining a control button (referred to as a succession control button) and the representative character. For reference, in the embodiment of the present invention, a representative character is usually allocated to a BLE and used as a base character when a full BK is designed.

This is for overcoming the restriction in space on a keypad. That is, controls such as 2nd, 3rd, 4th and 5th (referred to as succession controls) indicating turns of characters belonging to a representative character) which do not exist on a keyboard are assigned to a succession control button. A succeeding character is input by combining the representative character and the succession control. Such controls (2nd, 3rd, 4th, 5th, etc) can be selected by either of the PWSM and the BRSM. Similarly, when the succession control button is not used for inputting characters or other controls, it can be repeatedly pressed, that is, the RSM can be employed in selecting a succession control, regardless of an input method (PWSM or BRSM). The succession control can be selected before or after selecting a representative character.

When affix controls (affixed character controls) and succession controls are assigned to control buttons and selected by RSM, the controls are not necessary to be inscribed on the buttons in a terminal with a display window, thereby more simplifying the keypad. For example, when the [*] button is used as an affix control button, and when selection is determined according to the RSM, it is not necessary to inscribe affixes, which are sequentially selected whenever the button is pressed, on the affix control button, i.e., the [*] button. It is enough for the user to recognize that the [*] button is the affix control button. Similarly, when the [#] button is used as a succession control button, and when selection is determined according to the RSM, it is not necessary to inscribe the turns of succeeding characters, which are sequentially selected whenever the button is pressed, on the succession control button, i.e., the [#] button. It is enough for the user to recognize that the [#] button is the succession control button.

Use of a succession control button can simplify the arrangement of characters on a keypad. In particular, when representative characters are assigned to buttons one-to-one in a BK using RSM, ambiguity can be removed while the number of times buttons are pressed is not increased. When many succeeding characters exist, a plurality of succession control buttons (e.g., the [*] button for 2nd and 3rd succeeding characters and the [#] button for 4th and 5th succeeding characters) may be provided on a keypad to minimize the number of times buttons are pressed while removing ambiguity (refer to embodiments including one for Japanese).

A BK, on which only basic characters other than affixed characters are arranged by employing an affix control (an affixed character control), is referred to as an "abbreviated BK". A PK, on which only basic characters other than affixed characters are arranged by employing an affix control, is referred to as an "abbreviated PK". The term "Abbreviated Keypad (AK)" is used for indicating either the abbreviated BK or the abbreviated PK. A BK, on which only basic characters other than succeeding characters are arranged by employing the concept of succession control, is referred to as a "succession BK". A PK employing succession control is referred to a "succession PK". The term "Succession Keypad (SK)" is used for indicating either the succession BK or the succession PK. The term "Concise Keypad (CK)" is used for indicating either the AK or the SK.

The BK and PK on which all characters including affixed characters and succeeding characters are inscribed are referred to as a "full BK" and a "full PK", respectively. The term "Full Keypad (FK)" is used for indicating either the full BK or the full PK.

A method of processing an affixed character using an affix control on an AK is referred to as an "Affix Control Processing Method (ACPM)", and a method of processing a succeeding character on a SK is referred to as a "Succession Control Processing Method (SCPM)".

If a user remembers the arrangement of characters on a FK (a full BK or a full PK) even in a CK (an AK or a SK), he/she can input characters (characters with affixes or succeeding characters) not inscribed on the CK using the PWSM or the BRSM applied in the full BK or using the RSM applied in the full PK. On the contrary, a user can input succeeding characters or characters with affixes in the FK, using the ACPM or the SCPM. This means that a method according to the present invention is compatible with the FK and the CK.

The following brief description concerns how to design a BK considering the number of alphabet characters in each language. Most languages have about 30 alphabet characters. For example, there are 26 characters in English, 33 in Russian, and 30 in Bulgarian. The Korean alphabet is composed of 14 consonants and 10 vowels, but 33 characters are inscribed on a standard keyboard because of its property in that the combination of characters makes a syllable.

When a language has about 30 alphabet characters, the characters and numerals can be inscribed on a keypad using a 2×2 lattice. See FIG. 1-3. There are languages having about 50 alphabet characters. For example, Hindi has 46, Japanese has 46, and Myanmar has 44.

The compositions of alphabets of most languages have been described. Thai and Cambodia have particularly lots of alphabet characters. Thai has 76 alphabet characters consisting of 44 consonants (42 are used at present) and 32 vowels. Among the 76 characters, 62 characters consisting of 42 consonants and 20 vowel elements are actually used at present. The case of Thai is similar to Cambodia.

For languages having 27 or less alphabet characters, each of the [1] to [9] buttons may be assigned about 3 characters. Therefore, the HSC can be used, and the PWSM can be applied even if a BLE is not embossed on each button because a user can intuitively recognize the base characters when only the HSC or the VSC is used on a 3*3 keypad.

For languages having 28–30 alphabet characters, each of the [1] to [0] buttons may be assigned about 3 characters. When using the HSC, a 3×1 lattice can be applied to each button for allocation of characters. A keypad may be designed such that a 3×2 lattice is used for allocation of the characters of a certain alphabet and a numeral, or a 3×3 lattice is used for allocation of the alphabet characters of a certain language, a numeral, and the English alphabet characters. This is illustrated in FIG. 1-4. In FIG. 1-4, a reference character "A" denotes an alphabet character of the certain language. Alternatively, instead of using a lattice, a numeral may be allocated outside a lattice structure on each button, so a 3×2 lattice can be used for allocation of the alphabet characters of a certain language and the English alphabet characters. This is illustrated in FIG. 1-5. The IC, a horizontal adjacent straight combination (HASC) and a vertical adjacent straight combination (VASC) may also be used for allocation of characters on each button. In this case, a numeral can be allocated to a lattice element making the ADC, which is the same as the alphabet characters of a certain language and a numeral are arranged using a 2×2 lattice. When including the English alphabet, a 3×3 lattice will be used. This case is illustrated in FIG. 1-6.

For languages having 30–33 alphabet characters, each of the [1] to [0] buttons is assigned about 3 characters, and the remaining three characters are assigned to the [*] or [#] button. The three characters assigned to each of the [1] to [0] buttons are allocated to lattice elements corresponding to the HSC in a lattice. In this case, the arrangement for 30 or less characters can be applied. However, to accommodate all characters on the [1] to [0] numeral buttons, 3–4 characters may be assigned to each numeral button so that they are allocated to lattice elements making the HSC and VAC. In this case, the alphabet characters of a certain language and a numeral can be arranged using a 3×2 lattice. Only alphabet characters of the certain language are allocated to the lattice elements making the HSC. For further accommodating the English alphabets, a 3×3 lattice is used. See FIGS. 1-7 and 1-8.

For languages having 30–50 alphabet characters, each of the [1] to [0] buttons is assigned about 5 characters. Five characters are allocated to lattice elements making the HSC, VAC and the ADC on each button. In this case, all the alphabet characters of a certain language and numerals can be accommodated on the buttons using a 3×2 lattice. Only alphabet characters of the certain language are allocated to the lattice elements making the HSC. For further accommodating the English alphabet, a 3×3 lattice is used. In addition, five characters can be allocated to lattice elements making the HVSC. Refer to FIGS. 1-9 and 1-10.

These guidelines are not absolute, but modifications can be made depending on the properties of each language.

For most of the languages except Thai and Cambodian, all the alphabet characters and necessary numerals can be assigned to the buttons of a keypad using a 3×2 lattice. A 3×3 lattice is used for accommodating the alphabet characters of a non-Roman alphabet language, numerals and English alphabet characters. The PWSM can be applied to button combination on a 3*3 keypad. In this case, the [*] or [#] button can be used as a control button, and this control button can be repeatedly used according to the BRSM or the SRSM, regardless of an alphabet character input method (PWSM or BRSM).

When using a 3×3 lattice, any of the alphabet characters of a mother language, numerals and the English alphabet characters can be selected according to the PWSM by using the arrangement shown in FIG. 1-11. In FIG. 1-11, each of the [4], [5] and [6] buttons on the second row has the mother language's alphabet characters at the lattice elements on the second row (a base row) in a 3×3 lattice. Characters of the mother language's alphabet and a numeral are allocated to the lattice elements at the first row, and characters of the English alphabet are allocated to the lattice elements on the third row. It is obvious that the transposition between the allocation on the first row and the allocation on the second row is possible. A BK having such a design as described above is referred to as a "3*3 mother language-numeral-English BK". This is illustrated in FIG. 1-11.

Through allocation shown in FIG. 1-12, a user can select only a character of the mother language's alphabet or a numeral, except the English alphabet characters, according to the PWSM on a 3*3 keypad in mother's language mode. A BK having such a design is referred to as a "3*3 mother language-numeral BK". In this design, the English alphabet characters are consistently allocated to the bottom of each button. It is obvious that the English alphabet characters can be input in the mother language mode according to PWSM when using a 3*4 keypad.

It is obvious that modifications of these two types of BKs can be made by changing the contents allocated to the lattice elements of each row. Embodiments of the present invention propose the "3*3 mother language-numeral BK".

FIGS. 1-13 and 1-14 show the operating environments of the present invention. The present invention describes a method of recognizing the combination of pressed buttons and translating it to an alphabet character. A method according to this invention can be implemented in a client (a terminal) or in a server. FIG. 1-13 is a functional block diagram illustrating an example where the method is implemented in a client. A controller recognizes a pressed button on a keypad. A program for translating a pressed button or pressed buttons into an alphabet character is installed in a memory. The controller transmits the recognized pressed button(s) to the memory. Then, the memory translates the pressed button(s) into an alphabet character and transmits the result to a display unit, so that the result can be displayed through the display unit. The generated alphabet character can be sent to the server and used in the server. In FIG. 1-14, a client sends only a DTMF to a server, and the server recognizes the DTMF and translates it into an alphabet character.

BRIEF DESCRIPTION OF THE DRAWINGS

FIG. 1-2 illustrates examples in which only some of the available lattice elements are used in each button;

FIG. 1-3 illustrates examples of buttons having a 2×2 lattice (accommodating a numeral);

FIG. 1-4 illustrates an example of a button accommodating mother language's alphabet characters, numerals and the English alphabet characters using a 3×3 lattice for the mother language having 30 or less alphabet characters;

FIG. 1-5 illustrates an example of a button accommodating mother language's alphabet characters and the English alphabet characters using a 3×3 lattice for the mother language having 30 or less alphabet characters;

FIG. 1-6 illustrates an example of a button accommodating mother language's alphabet characters and numerals using a 2×2 lattice for the mother language having 30 or less alphabet characters;

FIG. 1-7 illustrates another example of a button accommodating mother language's alphabet characters, numerals and the English alphabet characters using a 3×3 lattice for the mother language having 30 or less alphabet characters;

FIG. 1-8 illustrates an example of a button accommodating mother language's alphabet characters, numerals and the English alphabet characters using a 3×3 lattice for the mother language having 30–33 alphabet characters;

FIG. 1-9 illustrates an example of a button accommodating mother language's alphabet characters, numerals and the English alphabet characters using a 3×3 lattice for the mother language having 33–35 alphabet characters;

FIG. 1-10 illustrates another example of a button accommodating mother language's alphabet characters, numerals and the English alphabet characters using a 3×3 lattice for the mother language having 33–35 alphabet characters;

FIG. 1-11 illustrates an example in which mother language's alphabet characters, English alphabet characters and numerals are inscribed on each button using an X*3 lattice, and all combinations can be implemented on a 3*3 keypad;

FIG. 1-12 illustrates an example in which mother language's alphabet characters, the English alphabet characters and numerals are inscribed on each button using an X*3 lattice, and the combinations of the mother language's alphabet characters and the combination of numerals can be implemented on a 3*3 keypad;

FIG. 1-13 is a block diagram illustrating a the configuration of a system in which a client generates an alphabet character;

FIG. 1-14 is a block diagram illustrating a the configuration of a system in which a server generates an alphabet character;

FIG. 2-1 illustrates an example in which a 3×1 lattice (a horizontal straight combination) is applied for the English alphabet;

FIG. 2-2 illustrates an example in which English alphabet characters are arranged on the basis of a base lattice element (BLE), depending on frequencies;

FIG. 3-1 illustrates an example of the allocation of controls for affixed characters for example, used in German and French;

FIG. 4-1 illustrates an example of assignment of the consonants in Korean according to a consonant assignment method 1;

FIG. 4-2 illustrates an example of assignment of the vowels in Korean according to a vowel assignment method 1;

FIG. 4-3 illustrates an example of allocation of the Korean alphabet characters according to the combination of the consonant assignment method 1 and the vowel assignment method 1;

FIG. 4-4 illustrates an example in which the tense consonants are removed from FIG. 4-3 and a control processing method is applied;

FIG. 4-5 illustrates an example in which the tense consonants, the aspriated consonants and extended vowels are removed from FIG. 4-3 and a control processing method is applied;

FIG. 5-1 illustrates an example in which characters are arranged on the basis of a BLE on each button using a 3×2 lattice, considering horizontal writing (a horizontal combination) first in Japanese;

FIG. 5-2 illustrates an example in which characters are arranged on the basis of a BLE on each button using a 3×2 lattice, considering vertical writing (a vertical combination) first in Japanese;

FIG. 5-3 illustrates an example in which characters are arranged on the basis of a BLE on each button, using a horizontal straight combination on a 3*3 keypad and considering horizontal writing (a horizontal combination) first in Japanese;

FIG. 5-4 illustrates an example in which characters are arranged on the basis of a BLE on each button, using a horizontal straight combination on a 3*3 keypad and considering vertical writing (a vertical combination) first in Japanese;

FIG. 5-5 illustrates an example in which characters are sequentially arranged using a 3×2 lattice and considering horizontal writing first in Japanese;

FIG. 5-6 illustrates an example in which only representative characters are inscribed on buttons, and a succeeding control button ([*]) is used for Japanese;

FIG. 5-7 illustrates an example in which only representative characters are inscribed on buttons, and succeeding control buttons ([*] and [#]) are used for Japanese;

FIG. 6-1 illustrates an example in which Arabic alphabet characters are inscribed on buttons using a 3×1 lattice;

FIG. 6-2 illustrates an example in which English alphabet characters are arranged considering a right side first in allocation for the Arabic alphabet characters;

FIG. 6-3 illustrates an example in which the keypad of FIG. 6-1 is modified into a Plain Keypad (PK);

FIG. 7-1 illustrates an example of the allocation of vowels (pairs of vowels are sequentially arranged) in Hindi;

FIG. 7-2 illustrates an example of the allocation of consonants in Hindi;

FIG. 7-3 illustrates an example in which Hindi alphabet characters are arranged using a 3×2 lattice (allocation considering horizontal writing first);

FIG. 7-4 illustrates an example in which the keypad of FIG. 7-3 is modified into a Concise Keypad (CK) (allocation considering vowel abbreviation);

FIG. 8-1 illustrates an example in which Thai alphabet characters are arranged in the order of "consonant-consonant-vowel-vowel" using a 2×2 lattice;

FIG. 8-2 illustrates an example in which Thai alphabet characters are arranged in the order of "consonant-vowel-consonant" using a 3×1 lattice; and FIG. 8-3 illustrates an example in which Thai alphabet characters are arranged in the order of "consonant-consonant-vowel-vowel-consonant-consonant" using a 3×2 lattice.

DISCUSSION OF THE EXEMPLARY EMBODIMENTS

Embodiments by languages will be described with reference to the attached drawings. A description of one embodiment can be applied for other languages in a similar manner.

1.1 English

The English alphabet has 26 characters. Each of the [1] to [9] buttons of a keypad can be assigned about three characters. Since the standard for English has been established, and each button is assigned about three elements including characters and/or a symbol in this standard, a user easily recognize that a horizontal straight combination (HSC) is employed according to a Part-Whole Selection Method (PWSM).

Figure 1:
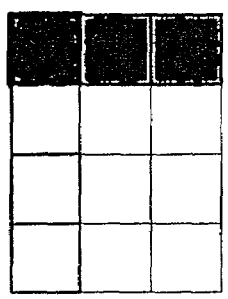
FIG. 1-1 illustrates examples of buttons provided with lattices.
Figure 1:
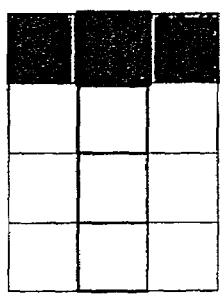
Figure 1:
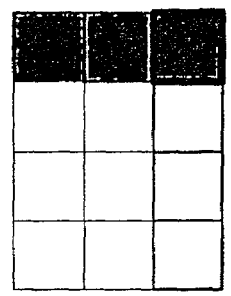
Figure 1:
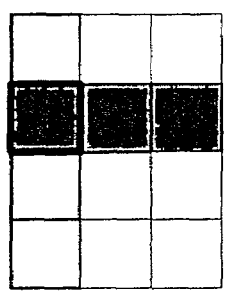
Figure 1:
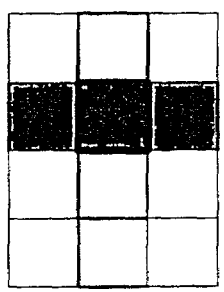
Figure 1:
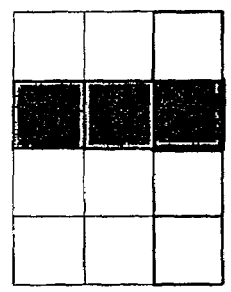
Figure 1:
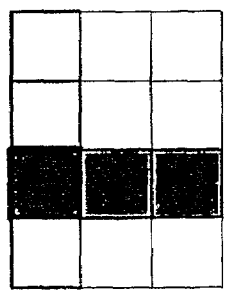
Figure 1:
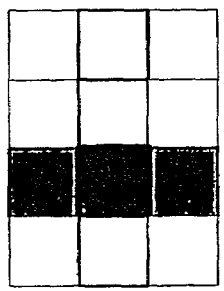
Figure 1:
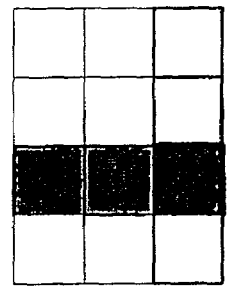
Figure 1:
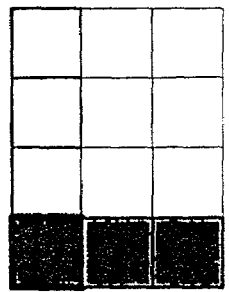
Figure 1:
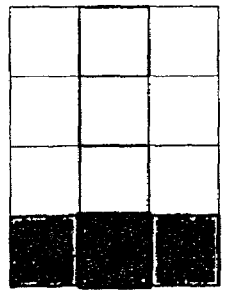
Figure 1:
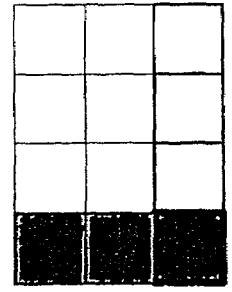
Figures 1, 2, 3, 4:
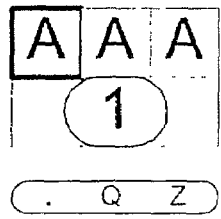

However, the position of a numeral on each button can be modified from a current general allocation (a numeral is usually allocated above three English alphabet characters) in order to allow the English alphabet characters and numerals to be input using the PWSM on a 3*3 keypad, as shown in FIG. 2-1.

1.1.1 Application of Base Repeat Selection Method (BRSM)

In applying the BRSM, selection order may be determined based on the Order of Proximity to a Base Lattice Element (OPBLE) and the number of times a button is pressed, unlike existing selection order. For example, in FIG. 2-1, a character F is selected when a [3] button is pressed once, a character E is selected when the [3] button is pressed two times, a character D is selected when the [3] button is pressed three times, and a numeral 3 is selected when the [3] button is pressed four times. A character U is selected when a [8] button is pressed once, a character T is selected when the [8] button is pressed two times, a character V is selected when the [8] button is pressed three times, and a numeral 8 is selected when the [8] button is pressed four times. A character G is selected when a [4] button is pressed once, a character H is selected when the [4] button is pressed two times, a character I is selected when the [4] button is pressed three times, and a numeral 4 is selected when the [4] button is pressed four times.

1.1.2 Example of Allocating Characters on the Basis of Base Lattice Element (BLE)

The efficiency of alphabet character input can be increased by allocating three characters, which are assigned to each button according to an existing English alphabet character assignment method based on use frequency and the OPBLE, as shown in FIG. 2-1.

While a conventional group of characters assigned to each button is maintained, the characters are arranged on the basis of a BLE as described above. Considering the use frequencies of characters, a most frequently used character in a group of characters assigned to a button is allocated to a BLE. A secondly frequently used character is allocated to a lattice element adjacent to the BLE. A method of inputting characters according to the PWSM is the same as a method described in the example of a sequential allocation. For example, in FIG. 2-2, selection is accomplished such that U=[8]+[8], T=[8]+[7] and V=[8]+[9].

Since the method described above maintains conventional standard alphabet character groups on buttons, it is advantageous in improving convenience in inputting a character while adopting the advantages of the conventional standard.

In the case of a group of characters A, B and C on a [2] button, the vowel A is most frequently used, so the character A is allocated to a BLE. In the case of a group of characters D, E and F on a [3] button, the vowel E most frequently used in the group is allocated to a BLE. In the case of a group of characters G, H and I on a [4] button, the vowel I most frequently used in the group is allocated to a BLE. In the case of a group of characters T, R and S on a [7] button, the character S most frequently used in the group is allocated to a BLE.

When characters are input according to a repeated selection method (RSM), the character E is input when the [3] button is pressed once, the character D is input when the [3] button is pressed two times, the character F is input when the [3] button is pressed three times, and a numeral 3 is input when the [3] button is pressed four times. The character U is input when the [8] button is pressed once, the character T is input when the [8] button is pressed two times, the character V is input when the [8] button is pressed three times, and a numeral 8 is input when the [8] button is pressed four times. The character I is selected when the [4] button is pressed once, a character G is selected when the [4] button is pressed two times, a character H is selected when the [4] button is pressed three times, and a numeral 4 is selected when the [4] button is pressed four times. This method is similar to a conventional method, but the selection order is determined based on the OPBLE.

1.2 Other Roman Alphabet Languages

Alphabets derived from the Roman alphabet have characters formed such that a variety of affixes ( . . . , v, ˆ, /, // and / (attached at the center of a character), \, -, ~, and s (attached at the bottom of a character as shown in "ç")) are attached to English alphabet characters (hereinafter, referred to as "basic characters"). Hereinafter, these characters are referred to as "affixed characters". In some languages, characters not included in the English alphabet exist, but the number of such characters is not large. These characters are referred to as "additional characters".

A Full Keypad (FK) on which all alphabet characters including affixed characters used in a particular language or several languages are inscribed can be constructed only by additionally allocating affixed characters at available lattice elements in the allocation of the English alphabet characters shown in FIG. 3-1. When constructing the FK, affixed characters can be allocated to lattice elements making a vertical combination or a diagonal combination in a 3×2 lattice on a button including a basic character corresponding to the affixed characters.

In another approach, an affixed character control or an affix control is assigned to a particular button. Any of the PWSM, BRSM and a Simple Repeat Selection Method (SRSM) can be used for control selection. However, the affix control button must not be used for a combination for inputting other controls or characters. When a RSM is used for control selection, it is not necessary to inscribe controls on a control button if a terminal has a display window. It is good enough for a user to have a perception that the control button is an affix control button.

An affixed character may be input by the combination of a control and a basic character. The control can be input before or after the character.

There are a variety of affixes in alphabets derived from the Roman alphabet, but only some of these affixes are used in a particular Roman alphabet language. Therefor, it is enough for a user to easily select some affixes used in his/her mother language. More specifically, when the PWSM or the BRSM is used for affix control selection, affix controls are allocated to lattice elements depending on use frequency and the OPBLE. When the SRSM is used for affix control selection, affix controls are arranged such that they can be easily selected depending on use frequencies. As mentioned above, when the RSM is used for control selection, it is not necessary to inscribe controls in a terminal having a display window.

For example, one affix (..) is used in German, and five affixes (/, ˆ, \, .. and s) are used in French. It may be happen that a French user wants to primarily input French and secondarily input German. For this case, a keypad may be designed such that the five affixes used in French can be easily selected depending on use frequencies. If the five affixes used in French are used frequently in the order of /, ˆ, \, .. and s, when the RSM is used, control selection is performed such that the affix / is selected when a control button for affixes is pressed once, and the affixes "ˆ, \, .. and s" are sequentially selected when the control button is pressed two, three, four and five times. It is obvious that the affixes can be allocated to lattice elements such that they are selected in the OPBLE on the affix control button when the BRSM is used for control selection.

On the contrary, when a German user wants to primarily input German and secondarily input French, control selection according to the RSM is designed such that an affix ".." used in German is selected when a control button is pressed once, and affixes "/, ˆ, \ and s" are sequentially selected when the control button is pressed two, three, four and five times, respectively. Although the affix ".." is not frequently used in French, it is natural to allow the affix ".." to be primarily selected since German should be primarily input.

Here, an additional character β not frequently used in German may be allocated to an available lattice element on a button including a basic character S or to a lattice element on the [0] button which is not used for allocation of the English alphabet characters. Alternatively, in order to process characters other than the basic characters using only one affix control button, input selection may be performed such that the affix ".." is selected when the affix control button is pressed once, and the additional character β is selected when the affix control button is pressed two times, considering the additional character β as an affixed character. Accordingly, the affixes "/, ˆ, \ and s" are sequentially selected when the control button is pressed three, four, five and six times. That is, the affixes used in French are selected starting from when the control button is pressed three times (German is primarily selected, and French is secondarily selected). FIG. 3-1 illustrates an example in which the [*] button is used as an affixed character control button, and controls are arranged on the [*] button. Here, selection may be performed such that the combination of an affix control and a basic character forms a single affixed character, and the additional character β is selected without combination. In other words, when a control is set to be selected after the input of a basic character, β=[*]+[*] and ä=a+[*].

Countries in Europe tend to be united in terms of politics, economics and community. Accordingly, for the selection order (the allocation order) of affixes used in languages used in the EU, affixes used in a mother language may be primarily selected depending on use frequencies, affixes used in other languages selected by a user may secondarily and thirdly selected, and affixes used in the remaining languages may be selected afterwards.

In inputting the characters of alphabets derived from the Roman alphabet, a button such as the [#] button can be used as an important temporary capital/small transition button.

Some languages do not use some of the English alphabet characters. However, since there is necessity of inputting an English alphabet character while inputting characters of a non-Roman alphabet language, all the English alphabet characters can be arranged on a keypad.

Affixed characters and additional characters used in various languages will be shown below.

1.2.1 German

In German, three affixed characters (Ä/ä, Ö/ö, Ü/ü) and one additional character β are used in addition to the basic English alphabet characters. Only one affixed character control (..) is necessary. The additional character β may be allocated to a lattice element which can make a vertical combination on a button including a character S or a lattice element on the [0] button. Alternatively, the additional character β may be arranged on a control button (that is, it may be arranged to be selected by the combination using the control button).

1.2.2 Vietnamese

Characters F, W and Z among the basic characters are not used, and seven affixed characters Ä/ä, Â/â, Đ/đ, Ê/ê, Ô/ô, Ó/ó, Ú/ú are additionally used. Since four affixes v, ˆ, / and - are used in the affixed characters, four kinds of controls for temporary mode transition are necessary.

1.2.3 French

The basic characters and 11 affixed characters é, ê, è, ë, à, â, î, û, ù, ç, ô are used. Five affixes "/, ˆ, \, .. and s" are used in the affixed characters.

1.2.4 Spanish

The basic characters, three additional characters "ch", "ll" and "rr" and a single affixed character "ñ" are used. The three additional characters "ch", "ll" and "rr" can be processed using basic characters. The affixed character "ñ" can be processed through single mode transition or the vertical combination on a button having a basic character.

1.2.5 Italian

The basic characters other than characters W, X and Y are used.

1.2.6 Dutch

The basic characters other than a character Y and an additional character "ij" are used. The additional character can be processed using two basic characters.

1.2.7 Czech

The basic characters, eight affixed characters (regardless of capital or small mode) and a single additional character "ch" are used. The single additional character can be processed using basic characters. Since sixteen affixed characters are formed such that an affix "v" is attached at the top of each basic character, it is enough if only one control for a temporary mode transition is set.

1.3 Korean 1.3.1 Composition of Korean

If a description of an embodiment for Korean is applicable to other languages, a corresponding description will be omitted in the descriptions of embodiments for other languages. When characters are distributed to buttons, this is referred to as "assignment", and when the individual lattice elements corresponding to the distributed characters on a button are determined, this is referred to as "allocation" or "arrangement".

The Korean alphabet is composed of 10 plain consonants, 10 basic vowels and 4 aspriated consonants. Considering the properties in notation of a syllable, five tense consonants and four extended vowels are provided on a standard keyboard.

| | Consonants | | | Vowels | |
|---|---|---|---|---|---|
| | Basic Consonants | | | | |
| Order | (Plain Consonants) | Aspriated Consonants | Tense Consonants | Basic Vowels | Extended Vowels |
| 1 | ㄱ | ㅋ | ㄲ | ㅏ | ㅐ |
| 2 | ㄴ | | | ㅑ | ㅒ |
| 3 | ㄷ | ㅌ | ㄸ | ㅓ | ㅔ |
| 4 | ㄹ | | | ㅕ | ㅖ |
| 5 | ㅁ | | | ㅗ | |
| 6 | ㅂ | ㅍ | ㅃ | ㅛ | |
| 7 | ㅅ | | ㅆ | ㅜ | |
| 8 | ㅇ | | | ㅠ | |
| 9 | ㅈ | ㅊ | ㅉ | — | |
| 10 | ㅎ | | | ㅣ | |

In Korean, one syllable is formed by the combination of characters and composed of an initial consonant+a medial vowel+a final consonant or an initial consonant+a medial vowel. It can be seen that consonants are more frequently used. The consonants are composed of plain consonants, aspriated consonants and tense consonants. They are frequently used in order of plain consonants, aspriated consonants and tense consonants. Accordingly, it may be determined that the characters in Korean are frequently used in order of plain consonants, basic vowels, extended vowels, aspriated consonants and tense consonants.

1.3.2 Embodiment of Allocating Korean Alphabet Characters and Numerals Using 2×2 Lattice When Korean alphabet characters arranged on a keypad using a 2×2 lattice, each of the ten buttons, i.e., [1] to [0] buttons, is assigned three characters, thereby accommodating 30 characters. The number of characters on a standard keyboard for inputting Korean is 33, but when using the 2×2 lattice, only a most frequently used vowel "ㅐ" among the four extended vowels is assigned to a button. The remaining extended vowels can be processed by combining basic vowels.

In assigning the consonants, the 10 basic consonants, i.e., the plain consonants, are assigned to the [1] to [0] buttons, respectively. The aspriated consonants and the tense consonants are allocated to lattice elements on buttons having their corresponding basic consonant. The ten basic vowels and the extended vowel "ㅐ" are allocated to the remaining lattice elements.

The PWSM or the BRSM can be used as an input method. When using the BRSM, selection order is determined in the OPBLE on a button, that is, a character at the BLE, a character at a lattice element making a horizontal adjacent straight combination, a character at a lattice element making a vertical adjacent straight combination and a character at a lattice element making an adjacent diagonal combination are sequentially selected.

1.3.3 Embodiment of Assigning Korean Alphabet Characters and Numerals Using 3×2 Lattice When assigning Korean alphabet characters on a keypad using a 3×2 lattice, the 10 basic consonants are assigned to the [1] to [0] buttons, respectively, and the 10 basic vowels are assigned to the [1] to [0] buttons, respectively. The simplest assignment is a sequential assignment. The present invention proposes a method of assigning the characters considering several elements such as the identifiability of the position of a representative consonant and a harmony with vowel assignment. The aspriated consonants and the tense consonants can be assigned to the buttons to which their corresponding basic consonants (plain consonants) are assigned.

1.3.3.1 Scheme of Assigning Vowels in Korean

The ten basic vowels ㅏ, ㅑ, ㅓ, ㅕ, ㅗ, ㅛ, ㅜ, ㅠ, ─ and ㅣ and the four extended vowels ㅐ, ㅒ, ㅔ and ㅖ are inscribed on a keyboard. The vowels have usually been assigned to buttons in order by row or column. However, in the present invention, the ten basic vowels are assigned to buttons such that the vowels ㅗ and ㅛ are assigned to the [1] and [2] buttons, respectively, the vowels ㅏ and ㅑ are assigned to the [3] and [6] buttons, respectively, the vowels ㅓ and ㅕ are assigned to the [4] and [7] buttons, respectively, the vowels ㅏ and ㅑ are assigned to the [3] and [6] buttons, respectively, and the vowels ㅜ and ㅠ are assigned to the [8] and [9] (or [9] and [8]) buttons, considering the directional properties of the basic vowels. The extended vowels ㅔ and ㅖ are assigned to the buttons including the basic vowels ㅓ and ㅕ, respectively. Since there is no space for the extended vowels ㅐ and ㅒ to be allocated to lattice elements making a horizontal straight combination on the buttons including their corresponding basic vowels, they are allocated to other available lattice elements making the horizontal straight combination, as shown in the drawing. They are allocated to lattice elements such that they face the outside, considering the left, right, up and down directional properties of the vowels.

On the contrary, the vowels can be assigned to be directed forward the inside based on their directional (left, right, up and down) properties. In other words, the vowels ㅜ and ㅠ are assigned to the [1] and [2] buttons, respectively, the vowels ㅓ and ㅕ are assigned to the [3] and [6] buttons, respectively, the vowels ㅏ and ㅑ are assigned to the [4] and [7] buttons, respectively, the vowels ㅓ and ㅕ are assigned to the [3] and [6] buttons, respectively, and the vowels ㅗ and ㅛ are assigned to the [8] and [9] (or [9] and [8]) buttons (see FIG. 4-2).

When the pairs of buttons [1, 2], [3, 6], [4, 7] and [8, 9] to which the pairs of vowels having left, right, up and down directions are marked with a different color, they forms a shape 卍 on the entire keypad. The pairs of vowels may be assigned to the pairs of buttons [1, 4], [2, 3], [6, 9] and [7, 8]. The reason of proposing the arrangement forming the shape 卍 representing the universal order is to wish persons possessing or using the shape 卍 that they be happy.

Finally, the vowels ㅡ and ㅣ are assigned to the [5] button at the center of the keypad. The [0] button is used for inputting a space or a control. Alternatively, one of the vowels ㅡ and ㅣ may be assigned to the [8] button, and the vowel ㅐ (ㅔ in the case of directing the vowels inward) may be assigned to the [5] button.

The 10 basic vowels are arranged to make a horizontal adjacent straight combination, and the extended vowels are arranged to make a horizontal 1 button gap straight combination.

1.3.3.2 Scheme of Assigning Consonants in Korean

The Korean alphabet includes 10 plain consonants. Four of them have aspriated consonants one-to-one. Five of them have tense consonants one-to-one. Conventionally, the consonants are classified into ten groups on the basis of the plain consonants when they are assigned on buttons. The groups of consonants are sequentially assigned depending on the order of the plain consonants in conventional assignment. However, it is not necessary to follow the order of the consonants when assigning the groups of consonants. In the present invention, although the consonants are classified into the groups on the basis of the plain consonants, the plain consonants are assigned considering their order and shapes. This will be described with reference to FIG. 4-3.

Firstly, the consonants ㄱ, ㄴ and ㄷ are assigned to the [1], [2] and [3] buttons (to make a self-combination). The reason why the plain consonants are arranged to make the identical combination has already been described. The consonant ㄱ is the first consonant and has a similar shape to the numeral 1, so that it is assigned to the [1] button. The consonant ㄴ is the second consonant and has two directions, so that it is assigned to the [2] button. The consonant ㄷ is the third consonant and can be viewed from three directions, so that it is assigned to the [3] button. Next, the consonant ㅁ is assigned to the [4] button since it can be viewed from four directions, so it can be easily associated with the [4] button intuitively.

The consonant ㅇ is assigned to the [5] button (not shown) since it is natural to position the consonant ㅇ having a circle shape at a position (the [5] button) corresponding to the heaven's circle on a keypad. The consonant ㅂ is assigned to the [6] buttons since it is a sixth consonant and has a similar shape to the numeral 6. The consonant ㅅ is assigned to the [7] button also considering its shape and order. The consonant ㄹ is assigned to the [8] button (not shown) since its shape is similar to the numeral 8. Its shape is also similar to the numeral 2, but the consonant ㄴ is already assigned to the [2] button. The consonants ㅈ and ㅎ are assigned to the [9] and [0] buttons, respectively, considering their order and shape (not shown).

Alternatively, when the consonant ㅇ is assigned to the [0] button, instead or the [5] button, since its shape is similar to the numeral 0, the consonant ㄹ can be assigned to the [5] button, and the consonant ㅎ may be assigned to the [8] button since its shape is similar to the numeral 8 as shown in FIG. 4-3.

Each of the plain consonants is allocated to a lattice element making an identical combination on a button. The aspriated consonants and the tense consonants are assigned to the buttons having their corresponding plain consonants according to the classification of the consonants. According to the two examples of assigning the consonants described above, the [2], [5], [8] and [0] buttons located on the center column are assigned only the plain consonants not having corresponding aspriated consonants and tense consonants. Among the consonants in a consonant group, a tense consonant (a double consonant) least frequently used in the group is arranged to make a vertical straight combination, and a vowel or vowels and an aspriated consonant are arranged to make a horizontal straight combination. In particular, the basic vowels are arranged to make a horizontal adjacent straight combination (HASC), and the extended vowels and the aspriated consonants are arranged to make a horizontal 1 button gap straight combination (H1 SC).

A period "." that is a symbol most frequently used is allocated to an empty lattice element making a vertical adjacent straight combination on the button assigned the consonant ㅁ.

The embodiments of assigning the consonants and the vowels on the basis of the basic consonants and the basic vowels can be summarized into the following tables.

| Button | Consonant assignment | | | |
|---|---|---|---|---|
| | Method 1 | Considered factor | Method 2 | Considered factor |
| [1] | ㄱ, ㅋ, ㄲ | Shape/order | ㄱ, ㅋ, ㄲ | Strokes/order |
| [2] | ㄴ | Strokes/order | ㄴ | Strokes/order |
| [3] | ㄷ, ㅌ, ㄸ | Strokes/order | ㄷ, ㅌ, ㄸ | Strokes/order |
| [4] | ㅁ | Strokes | ㅁ | Strokes |
| [5] | ㄹ | Strokes | ㅇ | Assign it to center |
| [6] | ㅂ, ㅍ, ㅃ | Strokes/order | ㅂ, ㅍ, ㅃ | Strokes/order |
| [7] | ㅅ, ㅆ | Order | ㅅ, ㅆ | Order |
| [8] | ㅎ | Shape | ㄹ | Shape |
| [9] | ㅈ, ㅊ, ㅉ | Order | ㅈ, ㅊ, ㅉ | Order |
| [0] | ㅇ | Shape | ㅎ | Order |

| Button | Vowel assignment | | | |
|---|---|---|---|---|
| | Method 1 (outward) | Method 2 (outward) | Method 3 (outward) | Method 4 (inward) |
| [1] | ㄹ | | | |
| [2] | ㅗ, ㅐ | ㅗ, ㅐ | ㅗ, ㅐ | ㅜ, ㅔ |
| [3] | ㅏ | ㅏ | ㅏ | ㅓ |
| [4] | ㅓ, ㅔ | ㅓ, ㅔ | ㅓ, ㅔ | ㅏ, ㅐ |
| [5] | ㅡ, ㅐ | ㅡ, ㅐ | ㅡ, ㅔ | ㅡ, ㅔ |
| [6] | ㅑ | ㅑ | ㅑ | ㅕ |
| [7] | ㅕ, ㅖ | ㅕ, ㅖ | ㅕ, ㅖ | ㅑ, ㅒ |
| [8] | ㅠ | | | ㅛ |
| [9] | ㅜ | | ㅜ | ㅗ |
| [0] | ㅣ | ㅣ | None | ㅣ |

In a modification of the consonant assignment method 1, the consonant ㄹ may be assigned to the [4] button, and the consonant ㅁ may be assigned to the [5] button considering the order used in Korean dictionaries. In the above consonant assignment methods, it is essential to assign the consonants ㄴ, ㄹ, ㅎ and ㅇ not having corresponding aspriated consonants and tense consonants are assigned to the [2], [5], [8] and [0] forming the center column. The vowel assignment methods 2 and 3 are modifications of the vowel assignment method 1 and different from the vowel assignment method 1 only in the portions marked with shadow in the table. The consonant assignment method 1 illustrated in FIG. 4-1, and the vowel assignment method 1 is illustrated in FIG. 4-2.

1.3.3.3 Scheme of Allocating Consonants and Vowels in Korean

As mentioned above, the Korean alphabet characters are frequently used in order of "plain consonants-basic vowels-extended vowels-aspriated consonants-tense consonants". The following table shows examples of allocating consonants and vowels to lattice elements on each button. Characters are allocated to lattice elements on a button in the OPBLE. When applying the OPBLE, that is, when applying the Convenient Order of Button Combination (COBC), generally, "identical combination, horizontal combination, straight combination and diagonal combination" is sequentially considered. Here, 2nd, 3rd, 4th and 5th denote the order, in which lattice elements on a button are adjacent to the BLE, and selection order when the BRSM is used. Here, when no character is allocated to the 4th, numeral can be selected through the 4th.

| Button | Allocation using consonant assignment method 1 + vowel assignment method 1 | | | | | Allocation using consonant assignment method 1 + vowel assignment method 2 | | | | | Allocation using consonant assignment method 1 + vowel assignment method 3 | | | | |
|---|---|---|---|---|---|---|---|---|---|---|---|---|---|---|---|
| | BLE | 2nd | 3rd | 4th | 5th | BLE | 2nd | 3rd | 4th | 5th | BLE | 2nd | 3rd | 4th | 5th |
| [1] | ㄱ | ㅗ | ㅋ | ㄲ | (1) | ㄱ | ㅗ | ㅋ | ㄲ | (1) | ㄱ | ㅗ | ㅋ | ㄲ | (1) |
| [2] | ㄴ | ㅛ | ㅐ | | (2) | ㄴ | ㅛ | ㅐ | | (2) | ㄴ | ㅛ | ㅐ | | (2) |
| [3] | ㄷ | ㅏ | ㅌ | ㄸ | (3) | ㄷ | ㅏ | ㅌ | ㄸ | (3) | ㄷ | ㅏ | ㅌ | ㄸ | (3) |
| [4] | ㅁ | ㅓ | ㅔ | . | (4) | ㅁ | ㅓ | ㅔ | . | (4) | ㅁ | ㅓ | ㅔ | . | (4) |
| [5] | ㄹ | — | ㅒ | | (5) | ㄹ | — | ㅒ | | (5) | ㄹ | — | ㅒ | | (5) |
| [6] | ㅂ | ㅑ | ㅍ | ㅃ | (6) | ㅂ | ㅑ | ㅍ | ㅃ | (6) | ㅂ | ㅑ | ㅍ | ㅃ | (6) |
| [7] | ㅅ | ㅕ | ㅖ | | (7) | ㅅ | ㅕ | ㅖ | | (7) | ㅅ | ㅕ | ㅖ | | (7) |
| [8] | ㅎ | ㅠ | @ | | (8) | ㅎ | ㅜ | @ | | (8) | ㅎ | ㅣ | ㅠ | | (8) |
| [9] | ㅈ | ㅜ | ㅊ | ㅉ | (9) | ㅈ | ㅠ | ㅊ | ㅉ | (9) | ㅈ | ㅜ | ㅊ | ㅉ | (9) |
| [0] | ㅇ | ㅣ | | | (0) | ㅇ | ㅣ | | | (0) | ㅇ | | | | (0) |

The example of allocation resulting from the combination of the consonant assignment method 1 and the vowel assignment method 1 is shown in FIG. 4-3.

1.3.4 Advantages of (Base) Repeated Selection Method in Korean

The RSM can be applied to a keypad formed for Korean according to the present invention. In the RSM, a character is selected in the OPBLE according to the number of times a button is pressed. Here, the OPBLE is determined considering lattice combinations in order of horizontal adjacent straight combination, horizontal straight combination, vertical straight combination and adjacent diagonal combination. This order can be applied to all the embodiments proposed for Korean in this specification.

Referring to FIG. 4-3, when the [1] button is pressed once, the consonant ㄱ is selected. When the [1] button is pressed two times, the vowel ㅗ is selected. When the [1] button is pressed three times, the consonant ㅋ is selected. When the [1] button is pressed four times, the consonant ㄲ is selected. When the [1] button is pressed fifth times, the numeral ㄲ is selected. Similarly, when the [2] button is pressed once, the consonant ㄴ is selected. When the [2] button is pressed two times, the vowel ㅛ is selected. When the [2] button is pressed three times, the consonant ㅐ is selected. When the [2] button is pressed fourth times, the numeral 2 is selected. In the same manner, when the [3] button is pressed once, the consonant ㄷ is selected. When the [3] button is pressed two times, the vowel ㅏ is selected. When the [3] button is pressed three times, the consonant ㅌ is selected. When the [3] button is pressed four times, the consonant ㄸ is selected. When the [3] button is pressed fifth times, the numeral 3 is selected.

Application of the RSM to FIG. 4-3 has the following advantages. Each of the basic consonants can be input by pressing a button only once, and each of the basic vowels can be input by pressing a button two times. Since the basic consonants are used for initial and final consonants, a total number of times of pressing buttons can be minimized. When it is considered that about half of the syllables in Korean are formed of an initial consonant and a medial vowel, about half of the syllables can be input by pressing buttons three times, and the remaining half of the syllables composed of an initial consonant, a medial vowel and a final consonant can be input by pressing buttons four times. Therefore, pressing buttons an average 3.5 times allows one syllable to be input. Thus, the number of times buttons are pressed for inputting a character is close to or less than the number of times buttons are pressed in a conventional character inputting method.

Although ambiguity in inputting a character still exists, it is considerably decreased. For example, when a user inputs a syllable "가" on a keypad as shown in FIG. 4-3, a user should press buttons like [1]+[3]+[3]. However, in the present invention, even if a user presses buttons like [1]+[3]+[3], the syllable "가" can be recognized because the combination of the [1] and [3] buttons is not supposed to be recognized as "ㄱㄷ". The case of a double final consonant is not general, so such a scheme is very helpful for general cases.

1.3.5 Affixed Character Processing on Tense Consonant (Embodiment of Allocating Korean Alphabet Characters Using 3×1 Lattice)

In "the consonant assignment method 1+the vowel assignment method 1", only characters other than the tense consonants can be arranged. The tense consonants are considered as the affixed characters of plain consonants, and one of the [*] and [#] buttons is used as an affixed character control button. Alternatively, the tense consonants may be considered as the succeeding characters of plain consonants. For example, when the [*] button is used as an affixed character control button, and the control button is set to first input, ㄲ=[*]+ㄱ. When the control button is set to later input, ㄲ=ㄱ+[*]. Since only one control for tense consonants is allocated to the control button, it is not necessary to use the PWSM. See FIG. 4-4.

In inputting characters inscribed on an Abbreviated Keypad (AK), either of the PWSM and the BRSM can be applied. When an AK is constructed, and the BRSM is applied, a plain consonant can be input by pressing a button once, and a basic vowel can be input by pressing a button two times, thereby decreasing the number of times buttons are pressed in inputting characters and greatly decreasing ambiguity when considering properties of Korean. This means that such a base AK can be made into a plain AK, in which only the SRSM can be applied. Making a base AK into a plain AK is constructing a Plain Keypad (PK) by allocating characters, which are arranged in the OPBLE on the base AK, in simple due order without applying the concept of a BLE.

1.3.6. Affixed Character Processing on Aspirated consonants and Tense Consonant, and Basic Vowel Combination Processing or Affixed Character Processing on Extended Vowels (Embodiment of Allocating Korean Alphabet Characters Using 2×1 Lattice)

Figures 1, 2, 3, 4, 5:
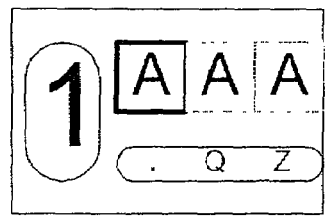

Reflecting the properties of Koreans, the 10 basic consonants are defined as representative characters and allocated to BLEs, and the 10 basic vowels are allocated to lattice elements making a horizontal straight combination. Only the basic consonants and vowels can be accommodated using a 2×1 lattice. When using a 3×1 lattice, the basic consonants and vowels and numerals can be accommodated, as shown in FIG. 4-5.

The aspriated consonants and the tense consonants can be processed as the affixed characters (or succeeding characters) of corresponding basic consonants. Since the aspriated consonants are more frequently used than the tense consonants generally, it can be inferred that the aspriated consonant control is allocated to the BLEs of an affixed character control button. Since the aspriated consonant and the tense consonant controls are assigned to a control button, and there are only two selectable controls (an aspriated consonant control and a tense consonant control), it is better to use the RSM in selecting a control. The [*] or [#] button can be used as the affix character control button.

For example, when the [*] button is used as the affixed character control button, and the control button is set to be input prior to a basic character, ㅋ=[*]+ㄱ and ㄲ=[*]+[*]. The basic consonant ㅅ does not have an aspriated consonant, so ㅆ=[*]+ㅅ and ㅆ=[*]+[*]+ㅅ. In this embodiment, the affixed character control button for consonants is simply referred to as a "consonant control button". Either of the PWSM and the BRSM can be used for selecting the basic consonant ㄱ inscribed on a keypad.

Each of the extended vowels can be input by combining basic vowels. For example, ㅖ=ㅕ+ㅣ. Either of the PWSM and the BRSM can be used for selecting the basic vowel ㅕ inscribed on a keypad. According to the method described above, there is rare ambiguity even if Korean is input using the RSM.

There is ambiguity only when three consecutive vowels are input (for example, a basic vowel+an extended vowel). For example, a syllable "왜" is composed of "ㅇ+ㅗ+ㅐ" when an extended vowel is input by combination of basic vowels, so button pressing for the vowel "ㅏ" between the vowels can be recognized as two consonants. In other words, "왜" can be recognized as "옫ㅣ", or "옫ㅣ" can be recognized as "왜". In this case, it is necessary to set time delay to overcome the problem. This problem rarely occurs only when "ㅞ" and "ㅙ" are intended to be input.

According to tests, in the case of using the RSM, actually, ambiguity occurs when one button is consecutively pressed three or more times, that is, when three or more characters are assigned to one button. When a character is input by pressing a button one or two times, actually, there is rare ambiguity. Accordingly, there is rare ambiguity even if vowel control process is not performed for the extended vowels.

To completely remove ambiguity in inputting the basic consonants and vowels (20 characters) according to the RSM, an affixed character control button for vowels can be set, considering the extended vowels as the affixed characters of basic vowels. For example, when the RSM is used for inputting the basic consonants and vowels, the [#] button is set as an affixed character control button for vowels, and the control button is set to be input prior to a basic vowel, ㅖ=[#]+ㅕ, ㅒ=[#]+ㅑ, ㅐ=[#]+ㅏ and ㅔ=[#]+ㅓ. When the control button is set to be input after a basic vowel, ㅖ=ㅕ+[#], ㅒ=ㅑ+[#], ㅐ=ㅏ+[#] and ㅔ=ㅓ+[#]. Here, the affixed character control button for vowels is simply referred to as a "vowel control button".

Similarly, a method using combination of basic vowel and a method of using affixed character control processing for vowels can be used together for inputting double vowels such as ㅘ, ㅝ and ㅢ which are formed by combination with the vowel "ㅣ" (such double vowels are referred to as "pseudo-extended vowel"). For example, when the [#] button is set as a control button, and the control button is set to be input after a basic character, ㅘ=ㅗ+[#], ㅝ=ㅜ+[#] and ㅢ=ㅡ+[#].

There is rare ambiguity when using the consonant control processing method and the vowel control processing method described above based on the following reasons. Korean has the following regularities. One syllable in Korean has one of the following compositions. Here, a vowel indicates a basic vowel, and a bracketed portion indicates the next syllable.

1. consonant+vowel (+consonant+vowel+ . . . )
2. consonant+vowel+consonant (+consonant+vowel+ . . . )
3. consonant+vowel+vowel (+consonant+vowel+ . . . )
4. consonant+vowel+vowel+consonant (+consonant+vowel+ . . . )
5. consonant+vowel+vowel+consonant+consonant (+consonant+vowel+ . . . )
6. consonant+vowel+vowel+vowel+consonant (+consonant+vowel+ . . . )

When three vowels (basic vowels) are consecutively repeated, the middle vowel between two vowels can be recognized as two consonants. Only such a case involves ambiguity. This ambiguity can be removed by processing the extended vowels using a vowel control button. As described above, a vowel control button and a consonant control button must be separately set in order to remove the ambiguity completely.

A consonant can be consecutively repeated a maximum or three times. However, for final consonants, the same consonant is not repeated. The basic consonants are individually assigned to different buttons, and the aspriated consonants and the tense consonants are processed using a control button, so that the consonants do not have ambiguity in consecutive input. Very rarely, in the case of number 5 described above, when the second and third consonants among the three consonants are the same, the two consonants can be recognized as a vowel, and thus this vowel may be form a double vowel with a succeeding vowel. Only in this case, there may be ambiguity. For example, when inputting "흙기", three consonants "ㄹ-ㄱ-ㄱ" are consecutively repeated. Here, two consecutive consonants "ㄱ-ㄱ" are the same, so they are recognized as a vowel. This vowel may be combined with the next vowel "ㅣ", thereby forming a double vowel. In this case, "흙기" is recognized as "흐리". Reversely, "흐리" may be recognized as "흙기". However, the possibility of such a case is 0.0x % according to related literature, and it can be neglected. For actually used words, the consonant "ㅇ" without a phonetic value generally follows a double final consonant as an initial consonant, and a double final consonant never has the consonant "ㅇ" at its end.

This means that an abbreviated Base Keypad (BK) in this embodiment can be modified into an abbreviated PK, and character input will be effected even if only the RSM is applied. On a BK, characters are arranged in the OPBLE, but on a PK characters are simply arranged from left to right or right to left.

However, since a vowel control button (e.g., a [#] button) must not used for inputting other characters, a combination, [0]+[#], must not be used for inputting a character "ㅣ" when the PWSM is used. For example, characters may be arranged such that the combination, [0]+[8], inputs the character "ㅣ".

1.3.7 Compatibility between FK and AK

Even if the aspriated consonants and the tense consonants are not inscribed on the button of a abbreviated BK, it can be easily remembered that the aspriated consonants can be selected by horizontal adjacent straight combination (HASC) in the PWSM or by pressing a corresponding button three times in the RSM. For users remembering this, selection can be designed such that either of the PWSM and the BRSM can be used for selecting the aspriated consonants. This is equivalently applied to the tense consonants (for example, vertical straight combination or pressing a button four times can select a tense consonant)

Similarly to the case of the consonants, even if the extended vowels are not inscribed on an abbreviated BK, when the PWSM is used on a full BK (FIG. 4-3) compatible with an abbreviated BK as shown in FIG. 4-5, it can be easily remembered that the vowels ㅔ(=[4]+[6]) and ㅖ(=[7]+[9]) are selected by "one button gap combination" with respect to the vowels ㅓ(=[4]+[5]) and ㅕ(=[7]+[8]), respectively, and the vowels ㅐ(=[2]+[3]) and ㅒ(=[5]+[6]) are selected by "symmetric combination" with respect to the vowels ㅏ(=[3]+[2]) and ㅑ(=[6]+[5]), respectively. Accordingly, for users remembering this, the extended vowels can be allowed to be input by the input methods (the PWSM and the BRMS) used on the full BK.

Similarly, even on the full BK, the aspriated consonants, tense consonants, extended vowels and the pseudo-extended vowels can be input by the PWSM or the BRSM, and an affixed character control processing method (ACPM) for consonants and an ACPM for vowels can also be used.

These facts described above can be equivalently applied when a BK is modified into a PK.

1.3.8 Modification of Base Keypad (BK) into Plain Keypad (PK)

A keypad proposed according to the present invention can accommodate both the PWSM and the RSM. However, for users that prefer the RSM, a keypad only for the RSM can be provided by slightly changing the arrangement of the characters on the keypad. In other words, the characters are sequentially arranged according to the order in which a character is selected as the number of times a button is pressed increases. Here, when horizontal straight combination is used, there is no change in the [1], [4] and [7] buttons at the first column on a keypad, a character at the first lattice element is exchanged with a character at the second lattice element on each of the [2], [5], [8] and [0] buttons at the second column, and a character at the first lattice element is exchanged with a character at the third lattice element on each of the [3], [6] and [9] buttons at the third column.

1.3.9 Method of Inputting Korean Alphabet Characters Using Syllable Completion Key A method of using a completion key in inputting characters, which has been conventionally used, can be applied to a keypad for Korean provided according to the present invention. When horizontal straight combination and vertical adjacent straight combination are applied, since the basic vowels are evenly distributed throughout a keypad, the keypad can be designed such that a basic consonant (an initial consonant) is selected when a button is pressed once, and a basic vowel (a medial vowel) is selected when the button is pressed once more. In this case, an extended vowel (a medial vowel) is selected by consecutively pressing the button once in the same manner. At this point, if a completion key (for example, the [#] button) is pressed, one syllable is completed. However, when a user intends to input an aspriated consonant, a tense consonant or a double vowel, a control key (for example, a [*] button) must be pressed first before a corresponding button is pressed.

For example, a character "ㅋ" is selected by the sequential combination of [*] and [1], and a character "ㄲ" is selected by the sequential combination of [*], [1] and [1]. Similarly, for the double vowels, a character "ㅔ" can be selected after a vowel by the sequential combination of [*] and [4], and a character "ㅖ" can be selected by the sequential combination of [*], [4] and [4]. However, there is ambiguity in an input operation when using this method, so time delay is necessary to remove the ambiguity. Moreover, a user needs to consider many exceptions and press the completion key whenever input of one syllable is completed.

1.4 Japanese

Japanese has 46 alphabet characters, so each button can be assigned five characters. Identical combination, horizontal combination, adjacent combination and straight combination can be sequentially considered in using a lattice on each button. In this case, horizontal straight combination, vertical adjacent straight combination and adjacent diagonal combination can be used on a 3*3 keypad. Here, a 3×2 lattice is used in allocating characters on a button, and lattice elements on each button can be efficiently used.

Identical combination, straight combination, horizontal combination and adjacent combination can be sequentially considered in using a lattice on each button. In this case, horizontal and vertical straight combination can be used on a 3*3 keypad. Here, a 3×3 lattice is used in allocating characters on a button.

1.4.1 Scheme of Assigning Characters in Japanese 46 characters are classified into groups, assigned to buttons and allocated to lattice elements in each button as shown in the following table.

| But-ton | Method 1 | | | | | | Method 2 | | | | | | Method 3 | | | | | |
|---|---|---|---|---|---|---|---|---|---|---|---|---|---|---|---|---|---|---|
| | BLE | 2nd | 3rd | 4th | 5th | 6th | BLE | 2nd | 3rd | 4th | 5th | 6th | BLE | 2nd | 3rd | 4th | 5th | 6th |
| [1] | あ | い | う | え | お | (1) | あ | い | う | え | お | (1) | あ | い | う | え | お | (1) |
| [2] | か | き | く | け | こ | (2) | か | き | く | け | こ | (2) | か | き | く | け | こ | (2) |
| [3] | さ | し | す | せ | そ | (3) | さ | し | す | せ | そ | (3) | さ | さ | す | せ | そ | (3) |
| [4] | た | ち | つ | て | と | (4) | た | ち | つ | て | と | (4) | た | ち | つ | て | と | (4) |
| [5] | な | に | ぬ | ね | の | (5) | な | に | ぬ | ね | の | (5) | な | に | ぬ | ね | の | (5) |
| [6] | は | ひ | ふ | へ | ほ | (6) | は | ひ | ふ | へ | ほ | (6) | は | ひ | ふ | へ | ほ | (6) |
| [7] | ま | み | む | め | も | (7) | ま | み | む | め | も | (7) | ま | み | む | め | も | (7) |
| [8] | や | ゆ | よ | わ | を | (8) | や | ゆ | よ | わ | を | (8) | や | ゆ | よ | | | (8) |
| [9] | ら | り | る | れ | ろ | (9) | ら | り | る | れ | ろ | (9) | ら | り | る | れ | ろ | (9) |
| [0] | ん | | | | | (0) | | | | | | (0) | わ | を | ん | | | (0) |

In allocating characters on the basis of a BLE, it is preferable to allocate a character, which has relatively higher use frequency and can represent the group of characters assigned to a given button, to a BLE. The characters あ, か, さ,. . . や, ら in the あ column are considered to be relatively frequently used and may represent respective groups, so the characters in the あ column can be allocated to BLEs.

When grouping the characters in the method 1, the や row and the わ row are grouped into one and assigned to one button since the や row has three characters や, ゆ and よ and the わ row has two characters わ and を, and they are similar in pronunciation.

The method 2 is the modification of the method 2. A character ん is suggestively assigned to another button to use the [0] button as a control button. Here, the character ん is assigned to the [9] button.

In the method 3, characters from respective classes forms a group, and the character ん is set to belong to a tenth row. Each of only the [8] and [0] buttons is assigned three characters.

When characters are arranged in the OPBLE according to each method, "allocation considering horizontal writing first" or "allocation considering vertical writing first" can be applied. In particular, Japan, allocation considering vertical writing first is proposed in inputting Japanese because vertical writing is still widely used in Japan, so it is useful in allocating and identifying characters. Examples of allocating characters based on the assignment of the method 1 are described below.

FIG. 5-1 illustrates an example in which characters are arranged on the basis of a BLE on each button using a 3×2 lattice, considering horizontal writing (a horizontal combination) first.

FIG. 5-2 illustrates an example in which characters are arranged on the basis of a BLE on each button using a 3×2 lattice, considering vertical writing (a vertical combination) first.

FIG. 5-3 illustrates an example in which characters are arranged on the basis of a BLE on each button, using a horizontal straight combination on a 3*3 keypad and considering horizontal writing (a horizontal combination) first.

FIG. 54 illustrates an example in which characters are arranged on the basis of a BLE on each button, using a horizontal straight combination on a 3*3 keypad and considering vertical writing (a vertical combination) first.

When the BRSM is applied to the above examples, the characters can be selected in alphabetic order as the number of times a button is pressed is increased. In other words, when the [1] button is pressed once, the character あ is selected. When the [1] button is pressed two times, the character い is selected. When the [1] button is pressed three times, the character う is selected. When the [1] button is pressed four times, the character え is selected. When the [1] button is pressed five times, the character お is selected. When the [1] button is pressed six times, numeral 1 is selected.

When allocating characters on each button, instead of allocating the character of the あ column to a BLE as a representative character on the button, the characters assigned to the button can be arranged in alphabetic order. FIG. 5-1 illustrates an example in which characters are sequentially arranged using a 3×2 lattice and considering horizontal writing first. In this case, when the PWSM is used, the character す is input such that す=[3]+[3]. Here, a keypad can be considered as a PK to which the RSM is applied, so the characters can be selected in alphabetic order.

1.4.2 Affixed Character Processing and Character Input Using Succeeding Control Button in Japanese Japanese characters include long sound characters (represented by small sized characters), voiced character (having two points (") at the upper right of a character) and unvoiced characters (having a one little circle (○) at the upper right of a character) as affixed characters (arranged in order of use frequency). Controls for forming the affixed characters can be set using the RSM such that they are selected depending on the number of times a control button is pressed. In this case, even if controls (for making long sound, voiced and unvoiced characters) are not inscribed on the control button, it will do for a user to know a given button is an affixed character control button.

When the [*] button is used as an affixed character control button, the RSM is used for selection of a control, and the control is set to be input following a character, ぎ=き+[*]+[*].

To simplify the arrangement of the characters on a keypad, a succession control can be used. Since there are many (46) alphabet characters in Japanese, it is difficult to inscribe all the characters on a keypad. Accordingly, in an embodiment of prior art, only the representative characters at the BLEs, that is, the characters あ, か, さ, . . . や, ら of the あ column, are inscribed on buttons, and the remaining characters (e.g., the characters い, う, え and お of the あ row) assigned to each button are set such that they can be selected by pressing a succession control button before or after character input.

SKs designed based on FIG. 5-1 through 5-4 will be described below.

When the [#] button is set as a succession control button (assuming the [*] button is set as an affix control button), and the succession control button is set to later input, characters are input such that あ=[1] (since only one character is inscribed on a button, it is not necessary to apply the PWSM to character selection), い=あ+[#] (i.e., [1]+[#]), う=[1]+[#]+[#], え=[1]+[#]+[#]+[#] and お=[1]+[#]+[#]+[#]+[#]. Here, buttons are pressed an average of three times, but it is advantageous in inscribing only one representative character on each button and removing input ambiguity, unlike the SRSM. See FIG. 5-6.

In another example, the [*] button may be set as a succession control button for inputting the second and third characters (e.g., い and う), and the [#] button may be set as a succession control button for inputting the fourth and fifth characters (e.g., え and お). That is, characters are input such that あ=[1], い=[1]+[*], う=[1]+[*]+[*], え=[1]+[#] and お=[1]+[#]+[#]. Here, buttons are pressed an average of 2.2 times, and input ambiguity can be removed. Here, the [*] button which is used for second and third controls can also be used for fourth and fifth controls so that the character え is input by [1]+[*]+[*]+[*], and the character お is input by [1]+[*]+[*]+[*]+[*]. See FIG. 5-7.

When using the [*] and [#] buttons as succession control buttons, there is a disadvantage in that an affix control button cannot be assigned on a 3*4 keypad. In this case, the character ん supposed to be assigned to the [0] button is assigned to one of the [1]–[9] buttons, and the [0] button can be used as an affix control button (or succession control button). When the character ん is assigned to the [9] button, the character ん is input by [9]+[#]+[#]+[#] (when a succession control is set to be input prior to a character). See FIG. 5-7.

Figures 1, 2, 3, 4, 5, 6:
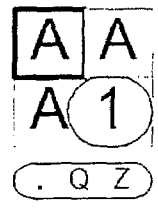
Figures 1, 2, 3, 4, 5, 6, 7:
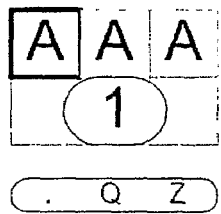

In FIG. 5-6 and 5-7, a "あア" control is provided for word-based mode transition between a "hiragana" and a "katakana". This is different from general continuous mode transition and mode transition among the long sound, voiced and unvoiced controls which is performed in units of characters. This is because a katakana is used intermittently in a usual sentence and used in units of words. In the chase where the "あア" control is set, when the "あア" control is selected first in a hiragana mode, a katakana word can be input, and thereafter, input mode is automatically transited into the hiragana mode. Like other controls, the "あア" control can be set to be input before or after a word.

1.5 Arabic 1.5.1 Allocation of Arabic Alphabet Characters

Arabic has 28 alphabet characters. When horizontal straight combination is applied, 27 characters can be assigned to the [1]–[9] buttons, and the remaining one character is assigned to the [0] button. Each of the Arabic alphabet characters denotes numeral. The following table shows Arabic alphabet characters and corresponding numerals.

| 1 | 2 | 3 | 4 | 5 | 6 | 7 | 8 | 9 |
|---|---|---|---|---|---|---|---|---|
| ا | ب | ج | د | ه | و | ز | ح | ط |
| 10 | 20 | 30 | 40 | 50 | 60 | 70 | 80 | 90 |
| ى | ك | ل | م | ن | س | ع | ف | ص |
| 100 | 200 | 300 | 400 | 500 | 600 | 700 | 800 | 900 | 1000 |
| ق | ر | ش | ت | ث | خ | ذ | ض | ظ | غ |

In assigning the characters to buttons, the characters ا, ى and ق denoting numerals 1, 10 and 100, respectively, can be assigned to the [1] button, and the characters ب, ك and ر denoting numerals 2, 20 and 200, respectively, can be assigned to the [2] button. In the same manner, the [3]–[9] buttons can be assigned characters. The remaining one character denoting numeral 1000 can be assigned to the [0] button. In other words, the Arabic alphabet characters are assigned to buttons such that the characters (except the character denoting numeral 1000) denoting numerals starting numeral 1 are assigned to the [1] button, the characters denoting numerals starting numeral 2 are assigned to the [2] button, and the like.

When the PWSM is applied to this assignment, each of the characters denoting numerals 1 to 9 is allocated to a BLE on a button. This is because each of the characters denoting numerals 1 to 9 can be a representative character representing the group of characters assigned to a corresponding button. Then, each of the characters denoting numerals 10 to 90 is allocated to a lattice element adjacent (not in physical sense but in sense of input convenience, that is, a lattice element making horizontal adjacent straight combination with the BLE) to the BLE. Each of the characters denoting numerals 100 to 900 is allocated to the remaining lattice element. The character denoting numeral 1000 is allocated to the BLE of the [0] button. As mentioned before, positions adjacent to a BLE vary with the feeling of each people and personal liking. Horizontal writing is usually applied to Arabic. However, not horizontal writing left to right (hereinafter, referred to as "left-to-right writing) usually used, but horizontal writing right to left (hereinafter, referred to as "right-to-left writing") is used. Accordingly, not a lattice element at the left of the BLE as usual, but a lattice element at the right of the BLE is determined to be adjacent to the BLE on the [2], [5], [8] and [0] buttons at the center column on a keypad. The above description is illustrated in FIG. 6-1.

When inputting characters using the PWSM on the keypad of FIG. 6-1, for example, the character و denoting numeral 6 is input by [6]+[6], the character س denoting numeral 60 is input by [6]+[5], and the character خ denoting numeral 600 is input by [6]+[4]. The remaining characters are input in the same manner.

When inputting characters using the RSM on the keypad of FIG. 1, for example, the character و denoting numeral 6 is input by [6], the character س denoting numeral 60 is input by [6]+[6], and the character خ denoting numeral 600 is input by [6]+[6]+[6]. For users more familiar with left-to-right writing, the character س denoting numeral 60 may be set to be input by [6]+[6]+[6], and the character خ denoting numeral 600 may be set to be input by [6]+[6].

A method of inputting the English alphabet characters is the same as a method disclosed in the initial application for the same invention. For example, the character G is input by the [4]+[*] in Arabic mode according to the PWSM and input by [4]+[4] in English mode according to the PWSM. The RSM in English mode is the same as a conventional method.

In FIG. 6-1, as usual, a lattice element at the left of the BLE may be used as a lattice element adjacent to the BLE on the [2], [5], [8] and [0] buttons at the center column. Here, the characters at the lattice elements having the BLE therebetween are exchanged. Input operation according to the PWSM or the RSM is similar to the method described in FIG. 6-1.

Considering Arabian's habit (right-to-left writing), the English alphabet characters may be allocated starting from right (right first allocation). The available allocation of the English alphabet characters for users who use Arabic is shown in FIG. 6-2.

The proposed keypad can accommodate both the PWSM and the RSM. However, for users that prefer the RSM, a keypad only for the RSM can be provided by changing the arrangement of the characters on the keypad a little. In other words, the characters are sequentially arranged according to the order in which a character is selected. In this case, considering the Arabian's habit (right-to-left writing), like the arrangement of the English alphabet characters shown in FIG. 6-2, the characters may be sequentially allocated starting from right to left, as shown in FIG. 6-3. The keypad of FIG. 6-3 is the modification of the keypad of FIG. 6-1 for the exclusive use of the RSM.

In FIG. 6-3, the characters ة, و and ا denoting numerals 100, 10 and 1, respectively, are sequentially arranged on the [1] button, and the allocation of the remaining characters is performed in the same manner.

1.5.2 Affixed Character Processing for Vowels in Arabic

The Arabic vowels can be made by attaching a particular symbol above or below the consonants (however, it is known that these vowels are rarely used). Accordingly, such vowels can be processed as the affixed characters of consonants. In other words, the particular vowel symbols are selected one by one whenever an affix control button is pressed. Alternatively, a vowel control may be assigned to an affix control button (or an affixed character control button), and selection may be performed according to the PWSM.

A keypad may be designed such that the vowel symbols are selected in order of use frequency when an affix control button is pressed. It is known that five vowel symbols, i.e., three short vowel symbols (Whatha, Kasra and Damma), Sucoon and Shatda are used most frequently. The five vowel symbols may be arranged on an affix control button in the OPBLE, or a keypad may be designed such that the five vowel symbols are selected depending on the number of times an affix control button is pressed.

The remaining vowel symbols including three long vowel symbols, two double vowel symbols, two auxiliary vowel symbols, Matda, Alif macsura and Dagger alif and so on may also be selected in order of use frequency.

Since there are many vowel symbols, it is better to process the more frequently used five vowel symbols using a single affix control button (e.g., the [*] button and to process the remaining vowel symbols using another affix control button (e.g., the [#] button) than to process all the vowel symbols using one affix control button.

1.6 Hindi 1.6.1 Assignment and Allocation of Alphabet Characters (Construction of Base Keypad)

The Hindi alphabet is composed of 11 vowels and 35 consonants, thereby having a total of 46 characters. Therefore, the examples suggested for Japanese can be applied. In other words, horizontal and vertical straight combination or horizontal straight combination and diagonal combination can be applied to allocation of characters to lattice elements on a button. For the order of allocation, sequential allocation or allocation on the basis of a BLE can be applied. In addition, a horizontal writing first method (left or right is given priority over top or bottom) or a vertical writing first method (top or bottom is given priority over left or right) can be applied. When the convenience of button combination is determined, horizontal combination may be given priority over vertical combination, or vice versa.

Also, it is necessary to appropriately group the consonants and the vowels. Hindi has the following 11 vowels. Each of the vowels except a vowel ऋ has a simplified form used when combined with a consonant.

| | Basic forms: | | | | | | | | | |
|---|---|---|---|---|---|---|---|---|---|---|
| a | aa | i | ee | u | oo | ae | aae | o | au | ri |
| अ | आ | इ | ई | उ | ऊ | ए | ऐ | ओ | औ | ऋ |
| | | | | Simplified forms: | | | | | | |
| None | aa | i | ee | u | oo | ae | aae | o | au | ri |
| | ा | ि | ी | ु | ू | े | ै | ो | ौ | ृ |

In Hindi, the vowels are usually combined with consonants and used in the simplified form. Accordingly, to improve identifiability by clearly discriminating the vowels from the consonants, the vowels except the vowel ऋ are preferably inscribed on buttons in the simplified form.

The ten vowels except the vowel ऋ(ri) are grouped into five pairs of a short vowel and a long vowel. The vowel ऋ(ri) is least frequently used. The 10 vowels may be sequentially assigned to ten buttons, i.e., the [1], [2], . . . , [0] buttons, as shown in FIG. 7-1. The location of each vowel on a button is determined considering the locations of consonants. The vowel ऋ(ri) is also allocated to a lattice element considering the location of consonants on a button (it is assigned to the [9] button in the below example showing allocation of the consonants). Alternatively, like allocation for Korean, buttons on a keypad can be grouped to allow the location of a character to be more easily recognized. The buttons can be grouped like ([1], [2]), ([3], [6]), ([4], [7]), ([8], [9]) and ([5], [0]) or like ([1], [4]), ([2], [3]), ([7], [8]), ([4], [9]) and ([5], [0]). Giving an example for the former case, the vowels अ(a) and आ(aa) are assigned to the [1] and [2] buttons, respectively. The vowels इ(i) and ई(ee) are assigned to the [3] and [6] buttons, respectively. The vowels उ(u) and ऊ(oo) are assigned to the [4] and [7] buttons, respectively. The vowels ए(e) and ऐ(ai) are assigned to the [8] and [9] buttons, respectively. The vowels ओ(o) and औ(au) are assigned to the [5] and [0] buttons, respectively. Finally, the vowel ऋ(ri) is assigned considering the assignment of the consonants (it is assigned to the [9] button in the below example showing assignment of the consonants).

The 35 consonants are shown below. Circles group the consonants.

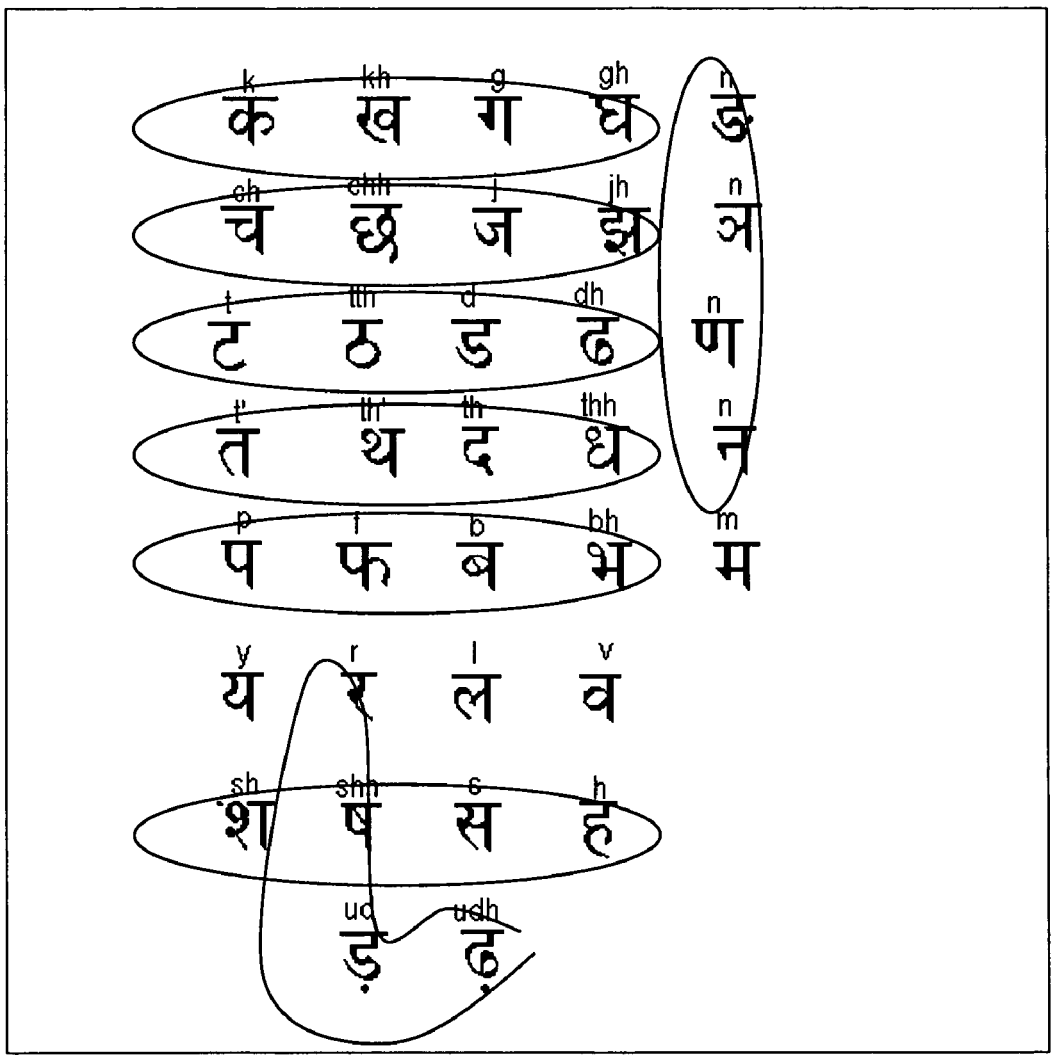

Similarly to the case of Japanese, five characters are assigned to each of the 9 buttons, i.e., the [1]–[9] buttons, thereby allowing the 45 characters to be accommodated. Accordingly, it is necessary to classify the consonants into groups each having about four consonants (only one group has three consonants). The consonants can be grouped as illustrated above, considering pronunciation. The modifications of the above grouping method can be applied.

A representative character, which is most frequently used in each group, can be allocated to a BLE. In this specification, the most frequently used consonants क(ka), च(ca), ट(ta), त(t'a), प(pa), न(na), म(ma), स(sa) and र(ra) are defined as representative consonants and allocated to the BLEs of the [1]–[9] buttons, respectively. The groups of consonants including the representative consonants are sequentially assigned to the [1]–[9] buttons, as shown in FIG. 7-2. Modifications can be made in assigning the consonant groups to buttons.

Besides the above consonants, there are five consonants used only for adopted words. Attaching a point below some of the above consonants makes these five consonants. The five consonants क़,ख़,ग़,ज़ and फ़ are made from the consonants क(ka), ख(kha), ग(ga), ज(ja) and फ(fa). These five consonants are not often used, so it is preferable to process them using affixed character control (affix control).

One syllable in Hindi is composed of "consonant+vowel+(consonant)", "consonant+vowel" or "vowel+consonant". Therefore, a representative consonant most frequently used in a corresponding group of consonants may be allocated to a BLE on a button, and one of the pairs of vowels described above may be allocated to a lattice element "adjacent to the BLE". The group of consonants including the representative consonant र(ra) has 3 consonants, and the pronunciation of the remaining vowel is similar to that of the representative consonant र(ra), so the vowel ऋ(ri) and this group of consonants together can be assigned to a button.

An example in which characters assigned to a button based on the above description are arranged on the button in the OPBLE is shown below. This example can be modified according to the use frequency of each character and other factors.

| Button | Characters (in OPBLE) | | | |
|---|---|---|---|---|
|  | BLE | 2nd | 3rd | 4th | 5th |
| [1] | क | अ | ग | ख | घ |
| [2] | च | आ | ज | छ | झ |
| [3] | ट | इ | ड | ठ | ए |
| [4] | त | उ | द | थ | ध |
| [5] | प | ओ | ब | फ | भ |
| [6] | न | ई | ङ | ञ | ण |
| [7] | म | ऊ | ल | य | व |
| [8] | स | ए | श | ष | ह |
| [9] | र | ऐ | ऋ | ड़ | ढ़ |
| [0] | औ | | | | |

The OPBLE may vary with horizontal writing first (left and right are given priority over top and bottom) or vertical writing first (top and bottom are given priority over left and right). As in the embodiments for Japanese, the characters can be allocated in a variety of ways. See FIG. 7-3.

When the PWSM is applied to the keypad of FIG. 7-3, character are input such that the character क(ka) is input by [1]+[1], the character अ(a) is input by [1]+[2], the character ग(ga) is input by [1]+[3], the character ख(kha) is input by [1]+[4], the character घ(gha) is input by [1]+[5], and the numeral 1 is input by [1]+[6].

Similarly, when the RSM is applied to the keypad of FIG. 7-3, characters are input such that when the [1] button is pressed once the character क(ka) is selected, and when the button is pressed two times, three times, four times, five times and six times, the characters अ(a), ग(ga), ख(kha) and घ(gha) and the numeral 1 are sequentially selected.

A BK can be made into a PK. That is, characters are plainly arranged on a button in the OPBLE. For this, the embodiment for Korean can be referred to.

1.6.2 Affixed Character Processing and Succession Control Processing for Hindi (Construction of Concise Keypad (CK))

Hindi has affixes such as "." (a dot above a character - semi-nasal consonant symbol), "_" (a non nasal consonant symbol) and "." (a dot below a character used for transcribing adopted words).

The affixes may be selected in order of use frequency according to the number of times an affix control button is pressed. Alternatively, the affixes may be arranged such that an affix more frequently used is allocated to a lattice element adjacent to the BLE of an affix control button.

For example, when it is determined that the affixes frequently used in order of "." (a dot above a character), "_" (non nasal consonant) and "." (a dot below a character) (that is, affix controls are allocated to lattice elements adjacent to a BLE in order of dot above a character, non nasal consonant and dot below a character), the [*] button is used as an affix control button, and the affix control is set to be input before a character, the character ग़ is input by [*]+[*]+[*]+ग.

The embodiments for Korean and Japanese can be applied to an embodiment for Hindi. In other words, the embodiment for Korean can be applied when allocating a representative consonant and a vowel to lattice elements on a button (a basic consonant is allocated to a BLE, and a vowel is allocated to a lattice element nearest to the BLE). The consonants other than the representative consonants on a button may be selected by pressing a succession control button before or after inputting the representative consonant. Here, each button can be assigned only two characters by assigning the vowel ऋ(ri) to the [0] button, so that character allocation and a keypad can be simplified. See FIG. 7-4.

For example, when the [#] button is set as a succession control button, and the control button is set to be input after a character, the character ग is input by क+[#]. The characters other than the representative characters have been arranged on a BK, mainly considering the use frequency. Alternatively, when they are allocated to lattice elements adjacent to a BLE on each button in alphabetic order, the character ग is input by क+[#]+[#] (the character ग is the third one in the क group in alphabetic order).

Such a CK has the following advantages. In Hindi, a syllable is mainly composed of "consonant+vowel" or "consonant+vowel+vowel", and such a structure is repeated to make a word. Theoretically, consonants cannot come consecutively two or more times, with the exception that the vowel अ is abbreviated and omitted when it comes after a consonant. As described in the case of Korean, when a most frequently used representative consonant is allocated to a BLE, and the representative consonant and vowels are selected according to the BRSM, there is usually no input ambiguity between consonants. Input ambiguity occurs only when consecutive two representative consonants are recognized as a single vowel, or when a single vowel is recognized as two representative consonants. However, such ambiguity can be largely decreased on the CK. In addition, the number of times buttons are pressed is decreased. A representative consonant most frequently used can be input by pressing a button once, and a vowel second most frequently used can be input by pressing a button two times, thereby minimizing a total number of times buttons are pressed for inputting characters.

In the case of Hindi, each representative character has three succeeding characters which are more than in the case of Korean. Accordingly, two most frequently used consonants among the four consonants assigned to each button can be allocated to lattice elements on a button, and character input is processed on the assumption that each of the two consonants has one succeeding character. Consequently, when a control is selected according to the RSM, the number of times a button is pressed for selecting a control can be decreased. In other words, the character ख is set as the succeeding character of the character क, and the character घ is set as the succeeding character of the character ग, so the characters क and ग are allocated to lattice elements on a button. In this case, however, since two consonants and one vowel are allocated to lattice elements on a button, ambiguity increases when the BRSM is applied.

1.6.3 Compatibility

Like the cases of Korean and Japanese, users memorizing the character allocation on a FK can use the PWSM or the BRSM in inputting succeeding characters even on a CK. On the contrary, succeeding characters can be input using a succession control processing method even on a FK.

1.7 Thai 1.7.1 Method of Allocating Consonants for Thai

Either of a FK and a CK can be constructed. Accordingly, all the 42 consonants may be arranged on a keypad, or some representative consonants may be arranged on a keypad.

In Thai, there are 44 consonants (actually, 42 consonants are used) and 21 sounds. All the 42 consonants may be arranged on a keypad, or 21 representative consonants more frequently used with respect to the 21 sounds are extracted and arranged on a keypad. Considering the allocation of nine basic vowels or vowel elements, two representative consonants are arranged on each of the [1]–[9] buttons, and the remaining three representative consonants are arranged on the [0] button. Alternatively, three basic consonants may be arranged on each of seven buttons so that 21 basic consonants are arranged on a keypad.

When allocating two or three representative consonants to each button, it is useful to group the representative consonants considering pronunciation. The remaining characters not frequently used with respect to the sounds may be input using a succession control button.

The characters corresponding to the 21 sounds and their pronunciation are shown below. A character coming first at each turn is frequently used, and thus considered as 21 representative consonants.

| Order | Character (Pronunciation) | Order | Character (Pronunciation) |
|---|---|---|---|
| 1 | ก(k•ə) | 12(*) | ผ พ ภ(ph•ə) |
| 2(*) | ข ค ฆ(kh•ə) | 13(*) | ฝ ฟ(f•ə) |
| 3 | ง(ng•ə) | 14 | ม(m•ə) |
| 4 | จ(c•ə) | 15 | ร(r•ə) |

-continued

| Order | Character (Pronunciation) | Order | Character (Pronunciation) |
|---|---|---|---|
| 5(*) | ฉ ช ฌ(ch•7) | 16 | ล ฬ(l•ə) |
| 6 | ฎ ฑ(d•ə) | 17 | ย ญ(y•ə) |
| 7 | ฏ ต(t•ə) | 18 | ว(w•ə) |
| 8(*) | ฐ ฑ ฒ ถ ท ธ(th•ə) | 19(*) | ส ศ ษ ซ(s•ə) |
| 9 | ณ น(n•ə) | 20 | ห ฮ(h•ə) |
| 10 | บ(b•ə) | 21 | อ(•ə) |
| 11 | | ป(p•ə) | |

A mark (*) indicates that there are two frequently used characters at a given turn. In other words, it can be considered that 27 consonants composed of 21 characters coming first at each ordered group and 6 characters extracted from the groups marked with (*) are frequently used.

When the 21 representative consonants are inscribed on a keypad, each of the remaining consonants not inscribed on the keypad can be input by combination of a representative character and a succession control button.

In the following example, all the 42 consonants are grouped and arranged on a keypad. When uniformly allocating the consonants throughout the keypad, 4 or 5 consonants are arranged on each button. When allocating the consonants to some (for example, seven) buttons considering the number and the pronunciation of the consonants, 6 consonants are arranged on each button using a 3×2 lattice.

| Button | Groups and allocation when all consonants are arranged |
|---|---|
| [1] | ก(k•ə) ข ค ฆ(kh•ə) |
| [2] | จ(c•ə) ฉ ช ฌ(ch•ə) |
| [3] | ฎ ฑ(d•ə) ฏ ต(t•ə) ฐ(th•ə) |
| [4] | ฐ ฑ ฒ ถ ท ธ(th•ə) |
| [5] | ณ น(n•ə) ม(m•ə) ง(ng•ə) |
| [6] | บ(b•ə) ป(p•ə) ฝ ฟ(f•ə) |
| [7] | ผ พ ภ(ph•ə) ร(r•ə) |
| [8] | ล ฬ(l•ə) ห ฮ(h•ə) |
| [9] | ย ญ(y•ə) ว(w•ə) อ(•ə) |
| [0] | ส ศ ษ ซ(s•ə) |

The following shows an example in which the consonants are classified into groups on the basis of 21 representative consonants, and the 21 representative consonants are arranged on buttons on a keypad.

| Button | Only first representative consonants are arranged on buttons and remaining consonants are processed using succession control |
|---|---|
| [1] | ก(k•ə) ข ค ฆ(kh•ə) |
| [2] | จ(c•ə) ฉ ช ฌ(ch•ə) |
| [3] | ฎ(d•ə) ม(m•ə) |
| [4] | ฏ(t•ə) ฐ ฑ ฒ ถ ท ธ(th•ə) |
| [5] | ณ(n•ə) ง(ng•ə) |
| [6] | บ(b•ə) ป(p•ə) |
| [7] | ผ พ ภ(ph•ə) ฝ ฟ(f•ə) |
| [8] | ล(l•ə) ร(r•ə) |
| [9] | ย(y•ə) ว(w•ə) |
| [10] | อ(•ə) ส(s•ə) ห ฮ(h•ə) |

The above allocation is determined considering the similarity of pronunciation. Only the representative consonants coming first in each group are arranged on buttons on a keypad. That is, only 21 representative consonants marked with rectangles are arranged on buttons, and the remaining consonants are defined as the succeeding characters of the representative consonants and input using succession controls. The succeeding characters of each representative consonant are arranged in order of succeeding the representative character.

The allocation of characters on a keypad can be more simplified by restricting the number of representative consonants to 9 or 10. In this case, one representative consonant is selected from the consonants assigned to each button in the above method of grouping the consonants into 21 groups. The remaining consonants are processed using a succession control button. However, this method is disadvantageous in that a user should memorize characters included in a particular representative consonant group but having different pronunciation, and that a user needs to press a control button more times.

The remaining consonants (that is, consonants which are not inscribed on a keypad and processed using a succession control button) belonging to each representative consonant group can be determined considering the pronunciation and the shape of a character. In other words, a certain character can be determined to belong to a particular representative consonant group depending on its pronunciation and also can be determined to belong to another representative consonant group depending on its shape. In this case, input operation may be performed such that consonants having similar pronunciation to the representative consonant of each button are primarily selected whenever a succession control button is pressed, and after all these consonants are selected, consonants having similar shapes to the representative consonant are secondarily selected whenever the succession control button is pressed.

1.7.2 Method of Allocating Vowels for Thai

Thai has 9 basic vowels. Each of the 9 basic vowels is divided into a short vowel and a long vowel. 9 short vowels may be defined as representative vowels, or 9 sounds may be defined as representative vowels. The remaining vowels can be input by performing succession control process on the representative vowels. Since the long vowels are simpler than the short vowels, a keypad can be more simplified by defining 9 long vowels as representative vowels.

Similarly to the case of the consonants, the remaining vowels (that is, vowels which are not inscribed on a keypad and processed using a succession control button) belonging to each representative consonant group can be determined considering the pronunciation or the shape of a character. It is obvious that both pronunciation and shape can be considered together.

1.7.3 Allocation of Vowel elements and Succession Control Processing for Vowels in Thai In Thai, one vowel is compose of several character elements and is positioned at the top, bottom, left or right side of a consonant or the left and right sides of the consonant. It is difficult to perform input process using an automaton when changes in the shape of a vowel depending on a final consonant succeeding the vowel are not 100% regular. Therefore, an approach of separately processing the vowel elements can be considered.

Thai vowels can be classified into about 20 types according to shape (character element). For inputting the Thai vowels, representative vowel elements are extracted from the 20 types, and an affixed character control button or a succession control button are used on the basis of the representative vowel elements. The extracted vowel elements are considered as another language's alphabet characters.

The types of vowel elements can be arranged on the basis of a Unicode as follows. The vowel elements are classified into groups each having two or three elements according to shape. All the vowel elements may be arranged on a keypad. Alternatively, when the vowel elements may be properly grouped, representative vowel elements can be designated, and "affixed character control processing" or "succession control processing" is appliable. Each button may be assigned one or two vowel elements. When one vowel element is assigned to each button, representative vowel elements can be determined based on the use frequency. The remaining vowel elements not inscribed on a keypad can be processed using a control button.

| Button | Groups and allocation of vowel elements |
|---|---|
| [1] | ֊ ֊ |
| [2] | ֊ ֊ |
| [3] | ֊ ֊ ֊ |
| [4] | ๅ ๅ ๅ |
| [5] | ๅ ๅ |
| [6] | เ แ |
| [7] | ๐ .. |
| [8] | ๅ(short) ๅ(long) |
| [9] | ๅ ๅ |
|  | อ ย ว (vowel elements used in consonants and accommodated by allocation of consonants) |

1.7.4 Processing Unique Numeral in Thai

There are unique numerals 1 to 9 in Thai. When the RSM is used, each of the unique numerals may be selected after all characters assigned to a certain button are selected and before numeral corresponding to the button is selected. In other words, it is assumed that a unique numeral is suggestively assigned to each button.

1.7.5 Allocation of Consonants and Vowel Elements for Thai

When constructing a keypad (referred to as a "BK") using the concept of a BLE (it is not necessary to form the BLE into a lattice shape), and when uniformly distributing representative consonants and vowel elements to the [1]–[0] buttons, the consonants and the vowel elements are arranged as follows.

When representative consonants for 21 sounds are assigned to ten buttons, i.e., the [1]–[0] buttons, ten representative consonants for button groups are allocated to BLEs. In Thai, the structure of "consonant+vowel" is repeated, so each of the 10 representative vowel elements, the remaining representative consonant(s) and the remaining vowel element are sequentially allocated to lattice elements adjacent to a BLE on each button in order to minimize ambiguity. In other words, the characters supposed to be assigned to each button are arranged in order of consonant-vowel element-consonant-vowel element (simplified into "consonant-vowel-consonant-vowel") to lattice elements starting from a BLE. To more easily identify a character, the characters assigned to each button may be arranged in order of "consonant-consonant-vowel-vowel". When only one representative vowel element is assigned to each button, the last vowel element does not exist in the above allocation.

Not on a BK but on a keypad (referred to a "PK") exclusively used for the RSM, a consonant, a vowel and a consonant (and a vowel) may be allocated to lattice elements left to right on each button. Alternatively, a consonant, a consonant and a vowel (and a vowel) may be allocated to lattice elements left to right on each button.

Figures 1, 2, 3, 4, 5, 6, 7, 8:
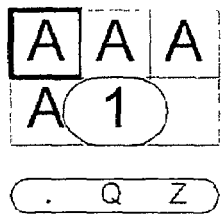
Figures 1, 2, 3, 4, 5, 6, 7, 8, 9:
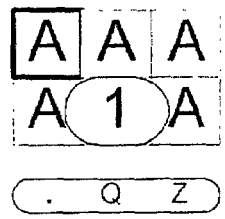
Figures 1, 2, 3, 4, 5, 6, 7, 8, 9, 10:
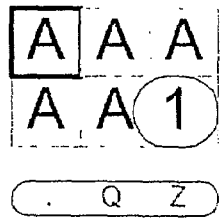
Figure 1:
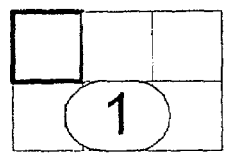
Figure 2:
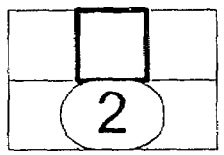
Figure 3:
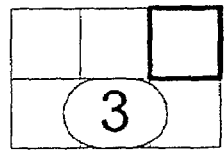
Figure 4:
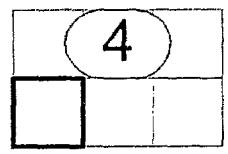
Figure 5:
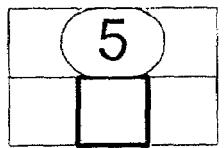
Figure 6:
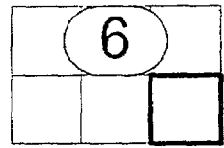
Figure 7:
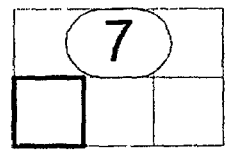
Figure 8:
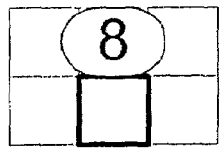
Figure 9:
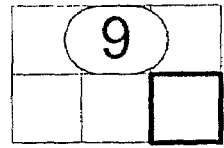
Figure 10:
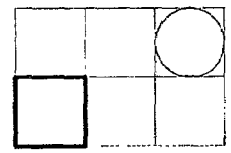
Figure 11:
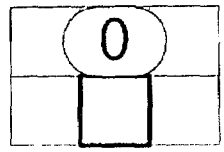
Figure 12:
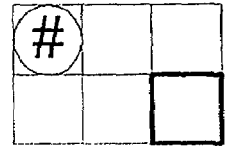
Figures 1, 2, 3, 4, 5, 6, 7, 8, 9, 10, 11, 12, 13:
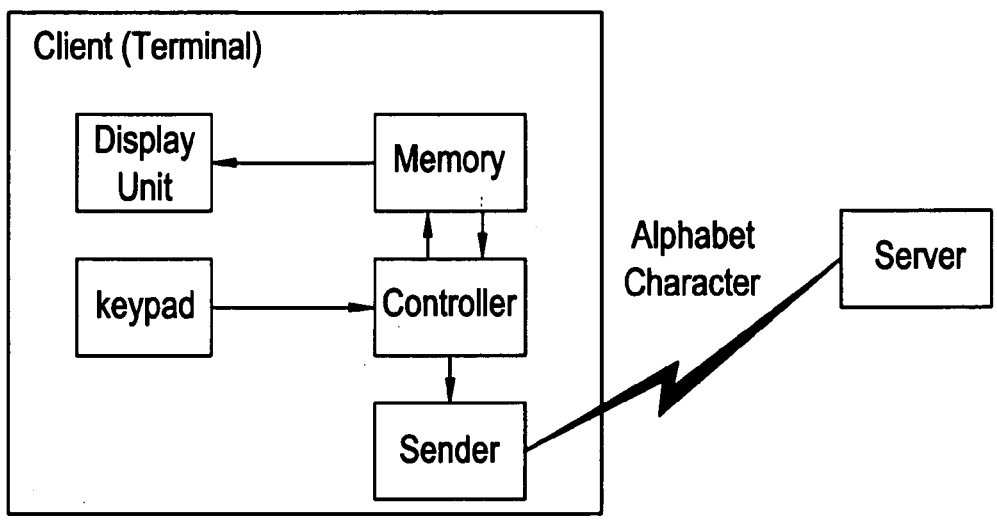
Figures 1, 2, 3, 4, 5, 6, 7, 8, 9, 10, 11, 12, 13, 14:
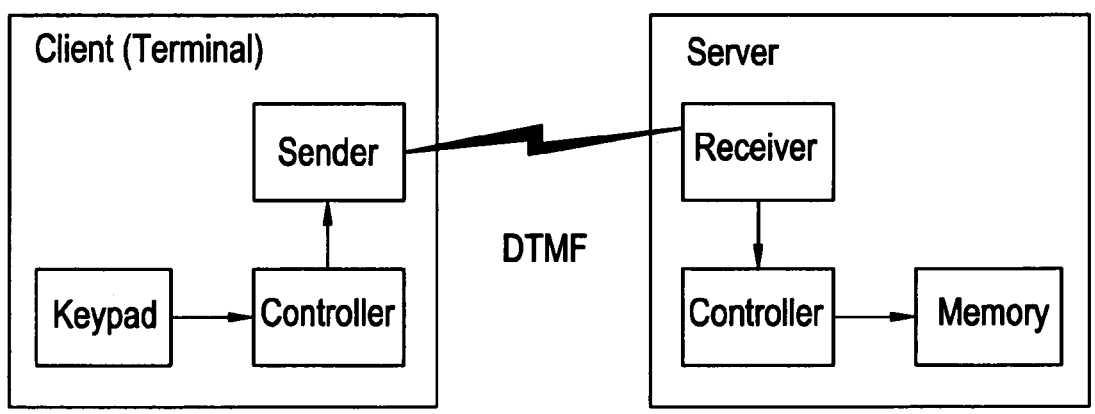
Figure 2:
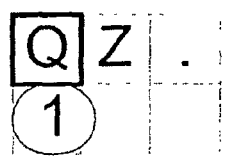
Figure 2:
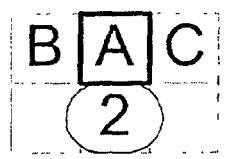
Figure 2:
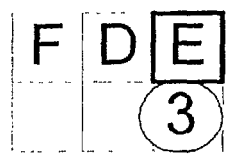
Figure 2:
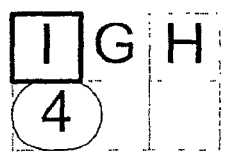
Figure 2:
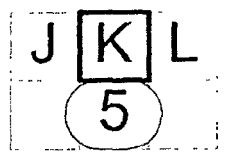
Figure 2:
Figure 2:
Figure 2:
Figure 2:
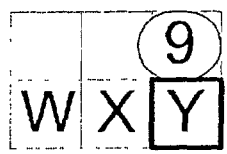
Figure 2:
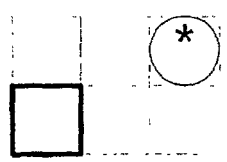
Figure 2:
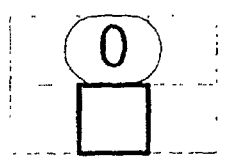
Figure 2:
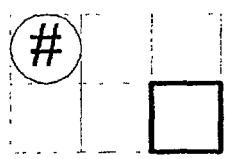
Figure 4:
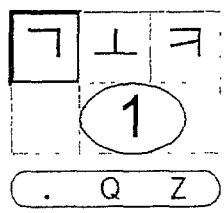
Figure 4:
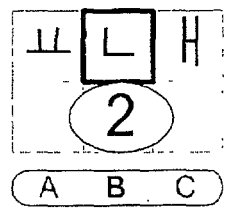
Figure 4:
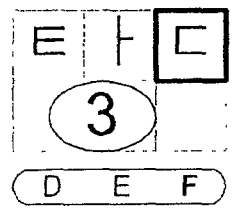
Figure 4:
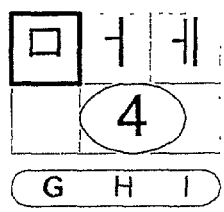
Figure 4:
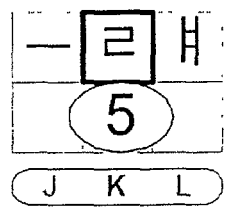
Figure 4:
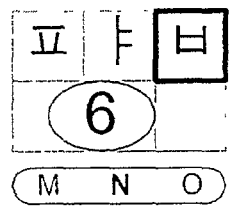
Figure 4:
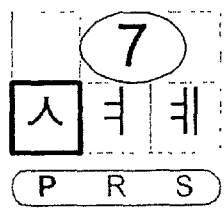
Figure 4:
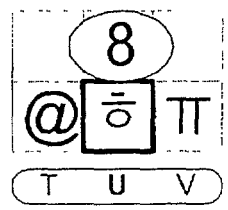
Figure 4:
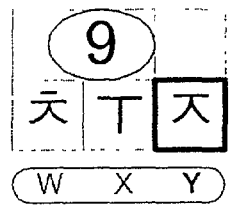
Figure 4:
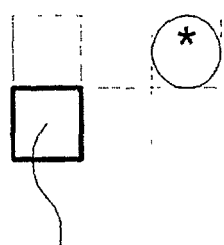
Figure 4:
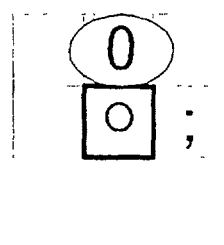
Figure 4:
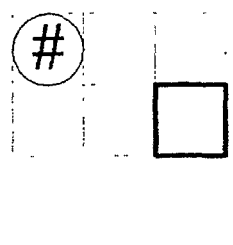
Figure 5:
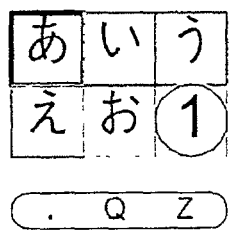
Figure 5:
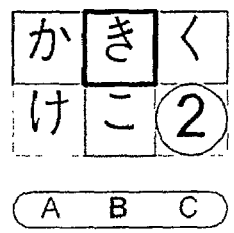
Figure 5:
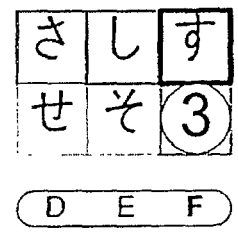
Figure 5:
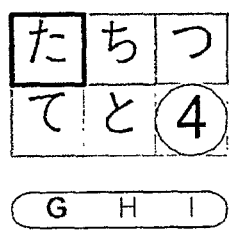
Figure 5:
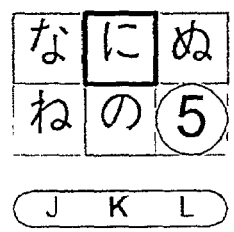
Figure 5:
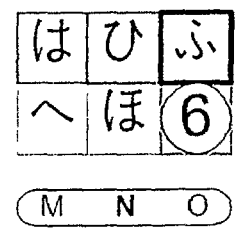
Figure 5:
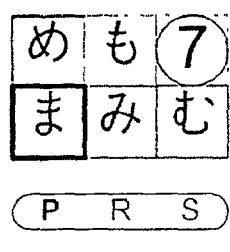
Figure 5:
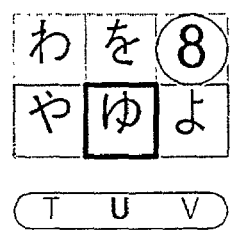
Figure 5:
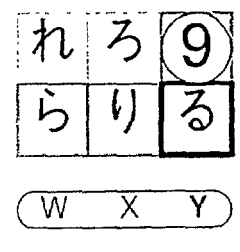
Figure 5:
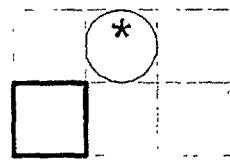
Figure 5:
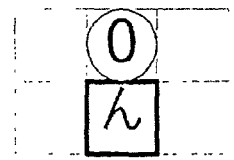
Figure 5:
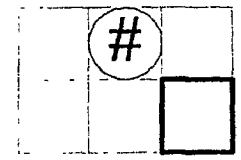

Each button on a BK can be constructed using a 3×2 lattice or a 2×2 lattice (space to which characters are allocated). FIG. 8-1 illustrates an example of a BK in which characters are arranged in a 2×2 lattice on each button in order of "consonant-consonant-vowel-vowel". FIG. 8-2 illustrates an example of a PK in which characters are arranged in a 3×1 lattice on each button in order of "consonant-vowel-vowel".

When all the consonants and vowel elements are arranged on buttons on a keypad, it is necessary to assign 6 characters to each button, so a 3×2 lattice is used. When constructing a BK, the characters can be arranged in order of "consonant-vowel-vowel-consonant-consonant-consonant" or "consonant-consonant-vowel-vowel-consonant-consonant" to the lattice elements in the order of proximity to a BK. However, 5 consonants are assigned to each of the [3] and [4] buttons, so one vowel element is assigned to each of the [3] and [4] buttons, and the remaining vowel elements can be assigned to the [0] or [#] button.

FIG. 8-3 illustrates an example of a BK in which characters are arranged in a 3×2 lattice on each button in order of "consonant-consonant-vowel-vowel-consonant-consonant" (in order of "consonant-consonant-vowel-consonant-consonant-consonant" in some buttons). In the embodiments according to the present invention, the OPBLE is not strictly applied in allocating the characters, but the characters are arranged such that adjacent characters make a consonant group or a vowel group.

1.7.6 Control Button Processing and Input Examples for Thai

In an embodiment of the present invention, it is necessary to process consonants and vowel elements, which are not inscribed on a keypad, and tones, using a control button. Thai has four tone symbols ่ ้ ๊ ๋. A control button may be specially provided. Alternatively, one of the [*] and [#] buttons on a 3*4 keypad may be used as control button (an affixed character control button) for tones, and the other is used as a control button (a succession control button) for processing the characters (or character elements) coming under the characters inscribed on the keypad. For example, in FIGS. 1, 2 and 3, when the [*] button is set as a tone control button, and the control button is set to later input, อ๋=อ+[*]+[*]+[*]+[*]. In FIGS. 1 and 2, when the [#] button is set as a vowel/consonant control button (a succession control button), and the control button is set to later input, ฟ=ค+[#]. In FIG. 1, when the [#] button is set as a vowel/consonant control button (a succession control button), and the control button is set to later input, ๅ=ๅ+[#] or ๅ=ๅ+[#]. In FIG. 8-2, when the [#] button is set as a vowel/consonant control button (a succession control button), and the control button is set to later input, ๅ=ๅ+[#] and ๅ=ๅ+[#]+[#].

1.8 Character Allocation and Input for Myanmar Language

The Myanmar language's alphabet has 33 consonants and 10 vowels. The Myanmar language is known as the letters of Southern Indian family. The cases for Hindi can be applied almost as they are. Compared to Hindi, the number of consonants is smaller by two, and the number of vowels is smaller by one. Since the pronunciation of the consonants of the Myanmar language is almost the same as that of Hindi, the case for Hindi can be applied in grouping the consonants. Tones and other symbols (for nasal, glottal stop, pause, period, etc) may be processed using affixed character controls.

1.9 Russian

Russian has 33 alphabet characters (Kiril letters). A BK is constructed by allocating three characters to each of 11 buttons, i.e., the [1]–[0] buttons and the [*] or [#] button, and either of a Microcosm Selection Method (MSM) and the RSM are used in inputting characters.

1.10 Character Allocation and Input for Bulgarian

Bulgarian has 33 alphabet characters (Kiril letters). A BK is constructed by allocating three characters to each of 10 buttons, i.e., the [1]–[0] buttons, and either of the MSM and the RSM are used in inputting characters.

1.11 Character Allocation and Input for Cambodian

Cambodian has lots of consonants and vowels, and one vowel is composed of several vowel elements, so the cases for Thai can be applied in inputting the characters.

INDUSTRIAL APPLICABILITY

As described above, according to the present invention, characters and numerals can be input without mode transition on a keypad, and a user can select an input method suitable for his/her liking and proficiency in operating buttons. In addition, alphabet characters of a variety of languages can be efficiently assigned to each button by properly using a BLE and peripheral lattice elements depending on the use frequency of the characters, thereby maximizing the input efficiency.

On a given full BK, either of the PWSM and the BRSM can be selectively used. On a CK, affixed characters and succeeding characters can be input through control processing. On a FK, affixed characters and succeeding characters can also be input through control processing. Users who can remember the allocation of characters on a FK can input affixed characters and succeeding characters through control processing on a CK.

Moreover, by allocating characters having higher use frequency to lattice elements on each button in the OPBLE, input efficiency of the PWSM is maximized, and the number of times a button is pressed in the RSM is minimized. For languages such as Korean, Hindi, Myanmar and the other language in which consonants and vowels alternately come after each other, representative consonants and vowels are uniformly assigned to buttons on a keypad, thereby minimizing ambiguity when the RSM is used in input operation.

Finally, representative consonants having phonetic values are allocated to BLEs on each button, so that they can be used for memorizing or naming telephone numbers and a variety of codes.

The invention claimed is:

1. A method for entering alphabet characters from a keypad including a plurality of buttons, wherein each button has a plurality of lattice elements, the arrangement of the lattice elements on each button corresponds to the arrangement of buttons on the keypad, and a plurality of alphabet characters are classified into some alphabet groups and each group is assigned to a corresponding button, the method comprising:

(a) sensing the selection of a first button and a second button to be sequentially pressed; and (b) recognizing a target character allocated to a first lattice element of the first button on the basis of the positions of the first button and the second button;

wherein, each button on the keypad is provided with some of lattice elements corresponding to some of the buttons of the keypad, each of the buttons on the keypad is provided with some of lattice elements according to the OPBLE (Order of Proximity to Base Lattice Element) or COBC (Convenient Order of Button Combination).

2. A method for entering alphabet characters from a keypad including a plurality of buttons, wherein each button has a plurality of lattice elements, the arrangement of the lattice elements on each button corresponds to the arrangement of buttons on the keypad, and a plurality of alphabet characters are classified into some alphabet groups and each group is assigned to a corresponding button, the method comprising:

(a) sensing the selection of a first button and a second button to be sequentially pressed; and (b) recognizing a target character allocated to a first lattice element of the first button on the basis of the positions of the first button and the second button, wherein alphabet characters are to be input using an HSC (Horizontal Straight Combination).

* * * * *